(12) United States Patent
Kuhlman et al.

(10) Patent No.: US 9,127,128 B2
(45) Date of Patent: *Sep. 8, 2015

(54) POLYETHERIMIDES, METHODS OF MANUFACTURE, AND ARTICLES FORMED THEREFROM

(75) Inventors: Matthew L. Kuhlman, Evansville, IN (US); Gurulingamurthy M. Haralur, Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 744 days.

This patent is subject to a terminal disclaimer.

(21) Appl. No.: 13/283,965

(22) Filed: Oct. 28, 2011

(65) Prior Publication Data
US 2013/0108852 A1    May 2, 2013

(51) Int. Cl.
C08G 73/00     (2006.01)
C08G 73/10     (2006.01)
C08L 79/08     (2006.01)

(52) U.S. Cl.
CPC ......... *C08G 73/1053* (2013.01); *C08G 73/1003* (2013.01); *C08G 73/1042* (2013.01); *C08L 79/08* (2013.01); *C08G 73/1046* (2013.01); *Y10T 428/31681* (2015.04)

(58) Field of Classification Search
CPC .................. C08G 73/1046; C08G 73/1042
USPC .................. 528/126, 128, 170, 171
See application file for complete search history.

(56) References Cited

U.S. PATENT DOCUMENTS

| | | | |
|---|---|---|---|
| 3,847,867 A | 11/1974 | Heath et al. | |
| 4,217,438 A | 8/1980 | Brunelle et al. | |
| 4,988,544 A | 1/1991 | Cella et al. | |
| 5,229,482 A | 7/1993 | Brunelle | |
| 5,830,974 A | 11/1998 | Schmidhauser et al. | |
| 5,908,915 A | 6/1999 | Brunelle | |
| 5,917,005 A | 6/1999 | Brunelle et al. | |
| 6,020,456 A | 2/2000 | Brunelle et al. | |
| 6,235,866 B1 | 5/2001 | Khouri et al. | |
| 6,849,706 B1 * | 2/2005 | Brunelle et al. | 528/170 |
| 6,906,168 B2 | 6/2005 | Khouri et al. | |
| 6,919,418 B2 | 7/2005 | Khouri et al. | |
| 7,481,959 B2 | 1/2009 | Richards et al. | |
| 7,714,095 B2 | 5/2010 | Brunelle et al. | |
| 8,357,773 B1 | 1/2013 | Gallucci et al. | |
| 2007/0043203 A1 * | 2/2007 | Ye et al. | 528/310 |
| 2013/0108851 A1 | 5/2013 | Kuhlman et al. | |
| 2015/0079376 A1 | 3/2015 | Kuhlman | |

FOREIGN PATENT DOCUMENTS

| | | |
|---|---|---|
| EP | 0892003 A2 | 1/1999 |
| EP | 2644641 A1 | 10/2013 |
| GB | 1392649 | 4/1975 |
| GB | 1485172 | 9/1977 |
| WO | 2009143440 A1 | 11/2009 |

OTHER PUBLICATIONS

Transmittal of the International Search Report of the International Searching Authority for PCT/US2012/062225, mailed Mar. 7, 2013, 5 pages.

(Continued)

*Primary Examiner* — Gregory Listvoyb
(74) *Attorney, Agent, or Firm* — Cantor Colburn LLP; Diderico van Eyl

(57) ABSTRACT

A polyetherimide composition comprising a polyetherimide manufactured by reaction of an alkali metal salt of a dihydroxy aromatic compound with a bis(halophthalimide) composition comprising, based on the weight of the bis(halophthalimide) composition, at least 15 wt. % of a 3,3'-bis(halophthalimide) of the formula

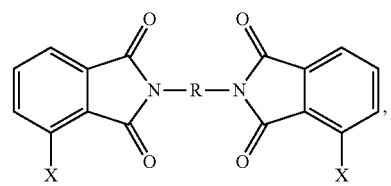

from more than 17 wt. % to less than 85 wt. % of a 4,3'-bis(halophthalimide) of the formula

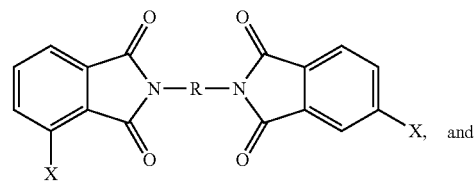

from more than 0 to less than 27 wt. % of a 4,4'-bis(halophthalimide) of the formula

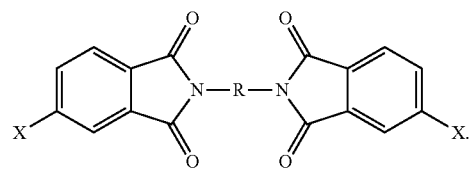

50 Claims, 2 Drawing Sheets

(56) References Cited

OTHER PUBLICATIONS

White, D.M., et al., "Polyetherimides Via Nitro-Dispalcement Polymerization: Monomer Synthesis and 13C-NMR Analysis of Monomers and Polymers", Journal of Polymer Science: Polymer Chemistry Edition, vol. 19, 1635-1658 (1981).

Written Opinion of the International Searching Authority for PCT/US2012/062225 mailed Mar. 7, 2013, 16 pages.

* cited by examiner

POLYETHERIMIDES, METHODS OF MANUFACTURE, AND ARTICLES FORMED THEREFROM

BACKGROUND OF THE INVENTION

This disclosure relates to polyetherimides and compositions containing the polyetherimides, as well as their method of manufacture and articles formed from the polyetherimide compositions.

Polyetherimides ("PEIs") are amorphous, transparent, high performance polymers having a glass transition temperature ("Tg") of greater than 180° C. PEIs further have high strength, heat resistance, and modulus, and broad chemical resistance, and so are widely used in applications as diverse as automotive, telecommunication, aerospace, electrical/electronics, transportation, and healthcare.

Polyetherimides can be manufactured commercially by a "halo-displacement process." As shown in FIG. 1, a halogen-substituted anhydride is reacted with a diamine to form a bishalophthalimide. The bishalophthalimide is then reacted with a metal salt of a dihydroxy compound. Despite extensive investigation into the manufacture of polyetherimides produced using the halo-displacement process, there nonetheless remains a need for further improvement. For example, some polyetherimides are currently manufactured using a 95:5 ratio of the 4-isomer to the 3-isomer of the halophthalic anhydride, which yields a product having excellent ductility. Increasing the relative ratio the 3-isomer can enhance flow and Tg of the polyetherimides, but above 50%, the cyclic n=1 byproduct dramatically increases from non-detectable to 1.5 to 15% by weight. These high levels can be detrimental, because the low molecular weight cyclic can act as plasticizer, thereby reducing the Tg. The low molecular weight cyclic byproduct also can diffuse out of molded parts at aggressive molding conditions, causing splay and other issues.

There accordingly remains a need in the art for methods for the manufacture of polyetherimides having improved properties, in particular polyetherimides having improved Tg and flow, but with reduced levels of byproducts, including halogenated byproducts and cyclic byproducts. It would be a further advantage if such improvements were obtained without significantly adversely affecting other desirable properties of the polyetherimides, for example one or more of heat deflection temperature, Vicat, and high tensile strength at yield.

SUMMARY OF THE INVENTION

In an embodiment, a polymer composition comprises a polyetherimide of the formula

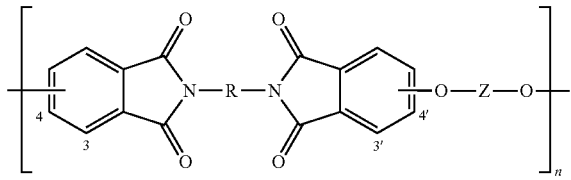

wherein n is greater than 1, each R is the same or different, and is selected from an aromatic hydrocarbon group having 6 to 30 carbon atoms, a halogenated derivative thereof, a straight or branched chain alkylene group having 2 to 10 carbon atoms, a cycloalkylene group having 3 to 10 carbon atoms, or a divalent group of the formula

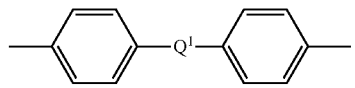

wherein $Q^1$ is selected from —O—, —S—, —C(O)—, —SO$_2$—, —SO—, and —C$_y$H$_{2y}$— wherein y is 1 to 5 and a halogenated derivative thereof, each Z is the same or different, and is an aromatic C$_{6-24}$ monocyclic or polycyclic moiety optionally substituted with 1 to 6 C$_{1-48}$ alkyl groups, 1 to 8 halogen atoms, or a combination thereof, and the divalent bonds between the —O—Z—O— group and the phenyl substituents are in the 3,3', 3,4', 4,3', and 4,4' positions, the divalent bonds of the of the —O—Z—O— group being made from a bis(halophthalimide) composition comprising, based on the weight of the bis(halophthalimide) composition, at least 15 wt. % of a 3,3'-bis(halophthalimide) of the formula

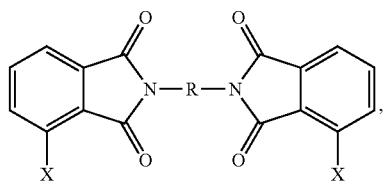

from more than 17 wt. % to less than 85 wt. % of a 4,3'-bis(halophthalimide) of the formula

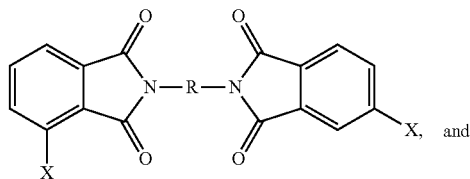

from more than 0 to less than 27 wt. % of a 4,4'-bis(halophthalimide) of the formula

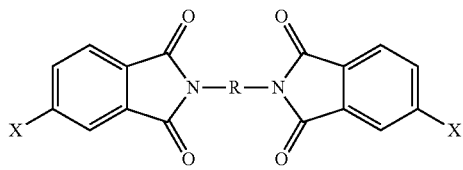

wherein X is independently fluoro, chloro, bromo, or iodo and R is as defined above.

In still another embodiment, a polyetherimide composition comprises a polyetherimide manufactured by reaction of an alkali metal salt of a dihydroxy aromatic compound of the formula

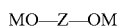

wherein M is an alkali metal and Z is an aromatic C$_{6-24}$ monocyclic or polycyclic moiety optionally substituted with 1 to 6 C$_{1-8}$ alkyl groups, 1 to 8 halogen atoms, or a combination thereof, with a bis(halophthalimide) composition comprising, based on the weight of the bis(halophthalimide) composition,
at least 15 wt. % of a 3,3'-bis(halophthalimide) of the formula

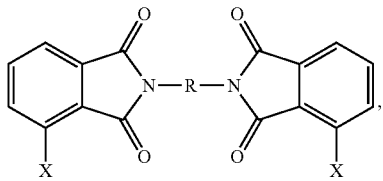

from more than 17 wt. % to less than 85 wt. % of a 4,3'-bis(halophthalimide) of the formula

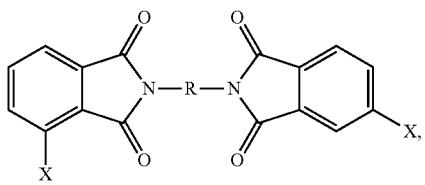

and from more than 0 to less than 27 wt. % of a 4,4'-bis(halophthalimide) of the formula

wherein each R is selected from an aromatic hydrocarbon group having 6 to 30 carbon atoms, a halogenated derivative thereof, a straight or branched chain alkylene group having 2 to 10 carbon atoms, a cycloalkylene group having 3 to 20 carbon atoms, or a divalent group of the formula

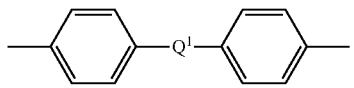

wherein $Q^1$ is selected from —O—, —S—, —C(O)—, —SO$_2$—, —SO—, —C$_y$H$_{2y}$— wherein y is 1 to 5, and a halogenated derivative thereof, and each X is independently fluoro, chloro, bromo, or iodo, and further wherein the polyetherimide is of the formula

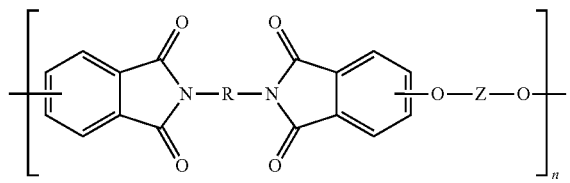

wherein n is greater than 1, each R is the same or different, each Z is the same or different, and are as defined above, and the divalent bonds between the —O—Z—O— group and the phenyl substituents are in the 3,3', 3,4', 4,3', and 4,4' positions.

In another embodiment, a polymer composition comprises a polyetherimide of the formula

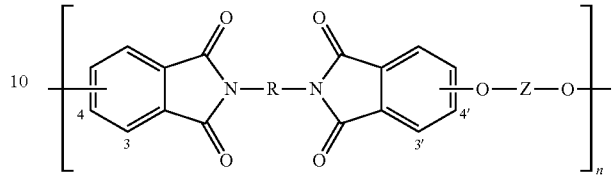

wherein n is greater than 1, each R is the same or different, and wherein R is selected from an aromatic hydrocarbon group having 6 to 30 carbon atoms, a halogenated derivative thereof, a straight or branched chain alkylene group having 2 to 10 carbon atoms, a cycloalkylene group having 3 to 10 carbon atoms, or a divalent group of the formula

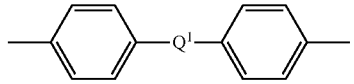

wherein $Q^1$ is selected from —O—, —S—, —C(O)—, —SO$_2$—, —SO—, —C$_y$H$_{2y}$— wherein y is 1 to 5, and a halogenated derivative thereof, each Z is the same or different and is an aromatic C$_{6-24}$ monocyclic or polycyclic moiety optionally substituted with 1 to 6 C$_{1-8}$ alkyl groups, 1 to 8 halogen atoms, or a combination thereof, and the divalent bonds between the —O—Z—O— group and the phenyl substituents are in the 3,3', 3,4', 4,3', and 4,4' positions; the divalent bonds of the —O—Z—O— group being made from a bis(halophthalimide) composition comprising, based on the weight of the bis(halophthalimide) composition,
at least 15 wt. % of a 3,3'-bis(halophthalimide) of the formula

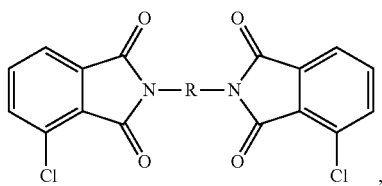

from more than 17 wt. % to less than 85 wt. % of a 4,3'-bis(halophthalimide) of the formula

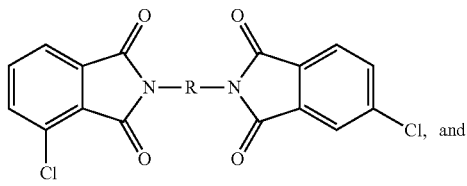

from more than 0 to less than 27 wt. % of a (4,4'-bis(halophthalimide) of the formula

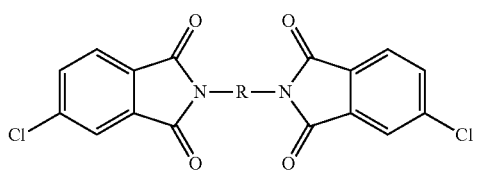

wherein R is as defined above.

Also disclosed is a polyetherimide composition comprising a polyetherimide manufactured by reaction of an alkali metal salt of a dihydroxy aromatic compound of the formula

MO—Z—OM wherein M is an alkali metal and Z is a divalent radical of the formula

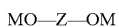

wherein Q is selected from —O—, —S—, —C(O)—, —SO$_2$—, —SO—, and —C$_y$H$_{2y}$— wherein y is an integer from 1 to 5 and a halogenated derivative thereof, with a bis(chlorophthalimide) composition comprising, based on the weight of the bis(chlorophthalimide) composition, at least 15 wt. % of a 3,3'-bis(chlorophthalimide) of the formula

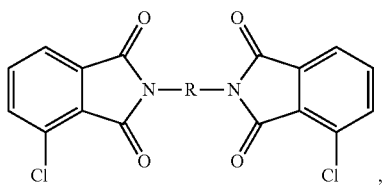

from more than 17 wt. % to less than 85 wt. % of a 4,3'-bis(chlorophthalimide) of the formula

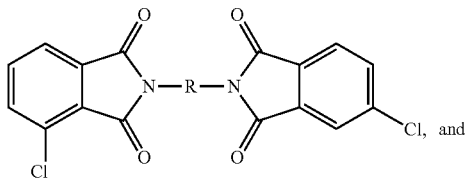

from more than 0 to less than 27 wt. % of a 4,4'-bis(chlorophthalimide) of the formula

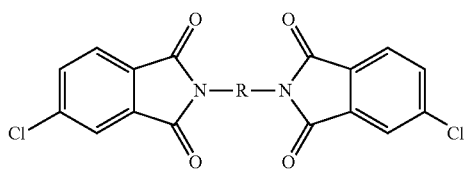

wherein each R is a divalent group of the formula

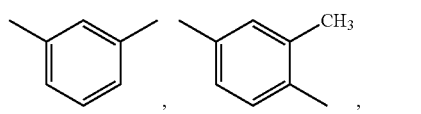

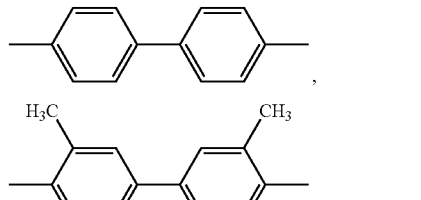

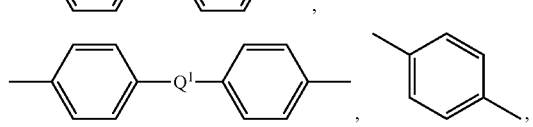

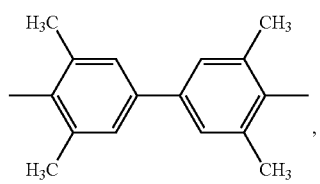

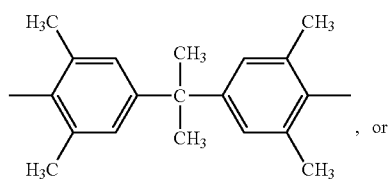

, or

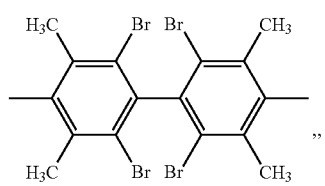

and Q$^1$ is selected from —O—, —S—, —C(O)—, —SO$_2$—, —SO—, and —C$_y$H$_{2y}$— wherein y is 1 to 5 and a halogenated derivative thereof, further wherein the polyetherimide is of the formula

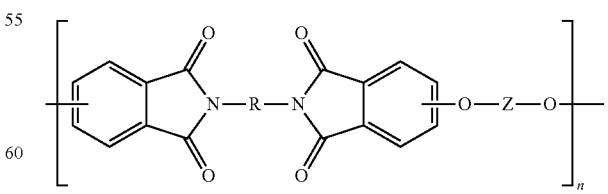

wherein n is greater than 1, each R is the same or different, each Z is the same or different, and are as defined above, and the divalent bonds between the —O—Z—O— group and the phenyl substituents are in the 3,3', 3,4', 4,3', and 4,4' positions.

Alternatively, a polymer composition comprises a polyetherimide having the formula

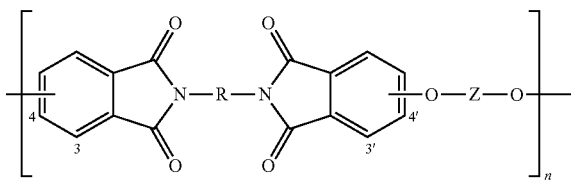

wherein n is greater than 1, each R is the same or different, and is selected from an aromatic hydrocarbon group having 6 to 30 carbon atoms, a halogenated derivative thereof, a straight or branched chain alkylene group having 2 to 10 carbon atoms, a cycloalkylene group having 3 to 10 carbon atoms, or a divalent group of the formula

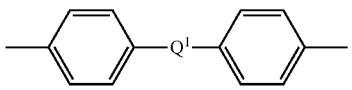

wherein $Q^1$ is selected from —O—, —S—, —C(O)—, —SO$_2$—, —SO—, and —C$_y$H$_{2y}$— wherein y is 1 to 5 and a halogenated derivative thereof, each Z is the same or different, and is an aromatic $C_{6-24}$ monocyclic or polycyclic moiety optionally substituted with 1 to 6 $C_{1-18}$ alkyl groups, 1 to 8 halogen atoms, or a combination thereof, and the divalent bonds between the —O—Z—O— group and the phenyl substituents are in the 3,3', 3,4', 4,3', and 4,4' positions, the divalent bonds of the of the —O—Z—O— group being made from a bis(halophthalimide) composition comprising, based on the weight of the bis(halophthalimide) composition, at least 15 wt. % of a 3,3'-bis(halophthalimide) of the formula

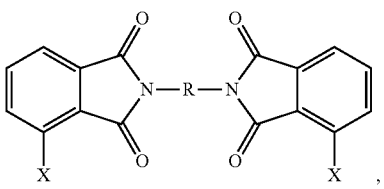

more than 10 wt. % of a 4,3'-bis(halophthalimide) of the formula

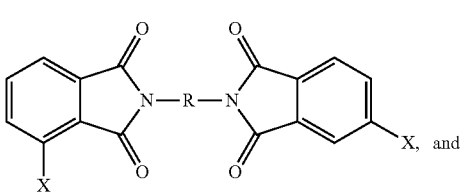

less than 27 wt. % of a 4,4'-bis(halophthalimide) of the formula

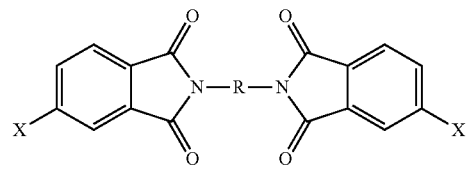

wherein each X is independently fluoro, chloro, bromo, or iodo and R is as defined above.

Also disclosed is a polyetherimide composition comprising a polyetherimide manufactured by reaction of an alkali metal salt of a dihydroxy aromatic compound of the formula

MO—Z—OM wherein M is an alkali metal, Z is an aromatic $C_{6-24}$ monocyclic or polycyclic moiety optionally substituted with 1 to 6 $C_{1-8}$ alkyl groups, 1 to 8 halogen atoms, or a combination thereof, with a bis(halophthalimide) composition comprising, based on the weight of the bis(halophthalimide) composition, at least 15 wt. % of a 3,3'-bis(halophthalimide) of the formula

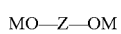

more than 10 wt. % of a 4,3'-bis(halophthalimide) of the formula

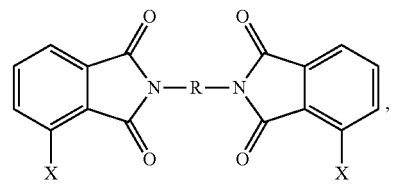

less than 27 wt. % of a 4,4'-bis(halophthalimide) of the formula

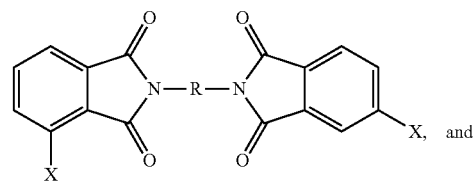

wherein each R is selected from an aromatic hydrocarbon group having 6 to 30 carbon atoms, a halogenated derivative thereof, a straight or branched chain alkylene group having 2 to 20 carbon atoms, a cycloalkylene group having 3 to 10 carbon atoms, or a divalent group of the formula

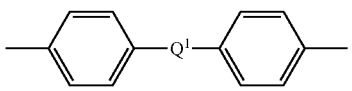

wherein $Q^1$ is selected from —O—, —S—, —C(O)—, —SO$_2$—, —SO—, —C$_y$H$_{2y}$— wherein y is 1 to 5 and a halogenated derivative thereof, each X is independently fluoro, chloro, bromo, or iodo, and further wherein the polyetherimide is of the formula

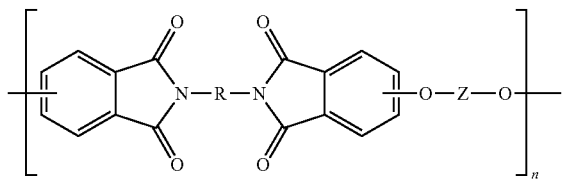

wherein n is greater than 1, each R is the same or different, each Z is the same or different, and are as defined above, the divalent bonds between the —O—Z—O— group and the phenyl substituents are in the 3,3', 3,4', 4,3', and 4,4' positions, and each X is independently fluoro, chloro, bromo, or iodo.

A method of manufacturing the above polyetherimides includes reacting, in the presence of a catalytically active amount of a phase transfer catalyst, the alkali metal salt of the dihydroxy aromatic compound with the bis(halophthalimide) composition.

In another embodiment, a polyetherimide is of the formula

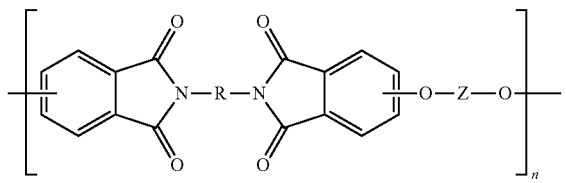

wherein based on the total weight percent of the —O—Z—O— groups in the polyetherimide,
at least 15 mol % the —O—Z—O— groups are in the 3,3' position,
from more than 17 mol % to less than 85 weight percent of the —O—Z—O— groups are in the 3,4', and 4',3 positions, and
from more than 0 to less than 27 mol % of the —O—Z—O— groups are 4,4' position; n is greater than 1; each R is independently an aromatic hydrocarbon group having 6 to 30 carbon atoms, a halogenated derivative thereof, a straight or branched chain alkylene group having 2 to 10 carbon atoms, a cycloalkylene group having 3 to 20 carbon atoms, or a divalent group of the formula

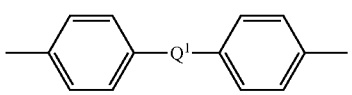

wherein $Q^1$ is selected from —O—, —S—, —C(O)—, —SO$_2$—, —SO—, and —C$_y$H$_{2y}$— wherein y is 1 to 5 and a halogenated derivative thereof; and Z is an aromatic C$_{6-24}$ monocyclic or polycyclic moiety optionally substituted with 1 to 6 C1-8 alkyl groups, 1 to 8 halogen atoms, or a combination thereof.

In still another embodiment, a polyetherimide is of the formula

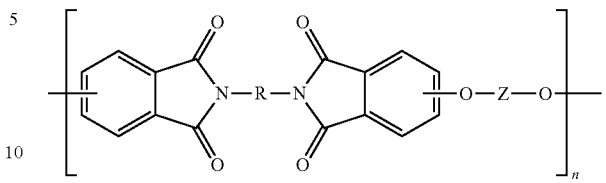

wherein based on the total weight percent of the —O—Z—O— groups in the polyetherimide,
at least 15 mol % of the —O—Z—O— groups are in the 3,3' position,
more than 10 mol % of the —O—Z—O— groups are in the 3,4', and 4',3 positions, and
less than 27 mol % of the —O—Z—O— groups are 4,4' position; n is greater than 1; each R is independently an aromatic hydrocarbon group having 6 to 30 carbon atoms, a halogenated derivative thereof, a straight or branched chain alkylene group having 2 to 10 carbon atoms, a cycloalkylene group having 3 to 20 carbon atoms, or a divalent group of the formula

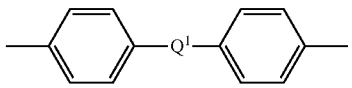

wherein $Q^1$ is selected from —O—, —S—, —C(O)—, —SO$_2$—, —SO—, and —C$_y$H$_{2y}$— wherein y is 1 to 5 and a halogenated derivative thereof; and Z is an aromatic C$_{6-24}$ monocyclic or polycyclic moiety optionally substituted with 1 to 6 C1-8 alkyl groups, 1 to 8 halogen atoms, or a combination thereof.

Compositions comprising the above polyetherimides are disclosed.

A method of manufacture of the above compositions includes melt blending the compositions of the aforementioned polyetherimides.

Articles comprising the above compositions are also disclosed. In an embodiment, the article is selected from a reflector, an optical lens, a fiber optic connector, and an adhesive, specifically an adhesive for adhering a metal to a fluoropolymer such as poly(tetrafluoroethylene). In another embodiment, an article comprises (i) a polytetrafluoroethylene substrate having a first surface, (ii) a metal substrate having a second surface, and (iii) the polymer composition of claim 1, situated between the polytetrafluoroethylene substrate and the metal substrate.

A method of forming the above articles includes shaping, extruding, blow molding, or injection molding the above compositions to form the article.

The invention is further illustrated by the Drawings, Detailed Description, and Examples.

DETAILED DESCRIPTION OF THE INVENTION

Figure 1:
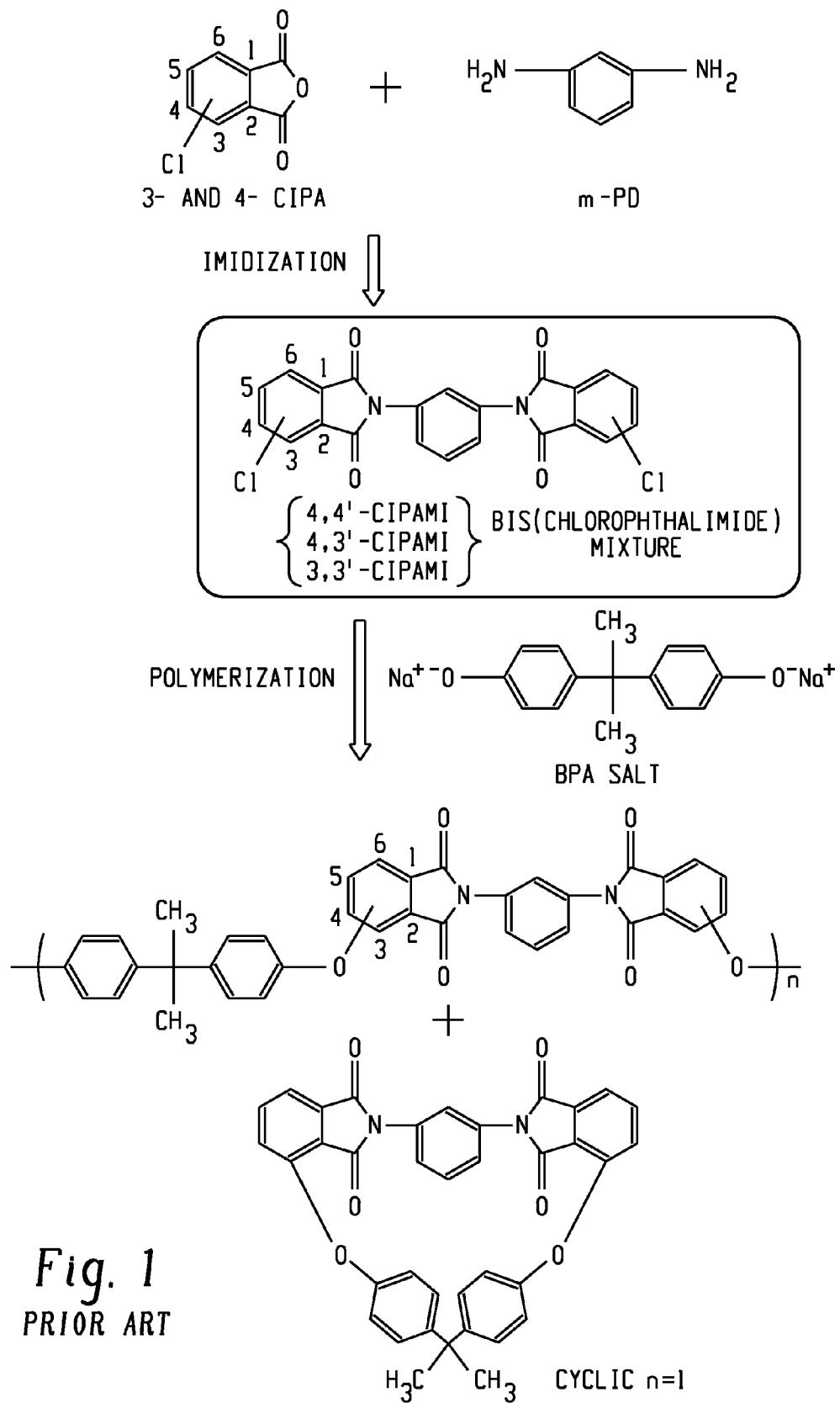
FIG. 1 shows a reaction scheme illustrating a chloro-displacement process for the manufacture of the polyetherimides.

The present inventors have discovered that precise control of the bis(halophthalimide) regioisomers used in the preparation of polyetherimides by the halo-displacement process provides polyetherimides having a reduced content of residuals and byproducts, and in particular a reduced content of the n=1 cyclic byproduct. Furthermore, the polyetherimides can have improved chemical and physical properties, including one or more of high glass transition temperature, heat deflection temperature, and Vicat, as well as improved high tensile strength at yield. Melt flow of the compositions is also acceptable for the manufacture of a wide variety of articles.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same composition or property are inclusive of the endpoint and independently combinable.

All molecular weights in this application refer to weight average molecular weights unless indicated otherwise and referenced to polystyrene standards. All such mentioned molecular weights are expressed in amu.

The terms "a" and "an" do not denote a limitation of quantity, but rather denote the presence of at least one of the referenced item. As used herein, "combination thereof" is inclusive of one or more of the recited elements, optionally together with a like element not recited. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and can or can not be present in other embodiments. In addition, it is to be understood that the described element(s) can be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" includes both $C_{1-30}$ branched and straight chain, unsaturated aliphatic hydrocarbon groups having the specified number of carbon atoms, e.g., methyl, ethyl, n-propyl, i-propyl, n-butyl, s-butyl, t-butyl, n-pentyl, s-pentyl, n- and s-hexyl, n- and s-heptyl, and, n- and s-octyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups.

The term "aryl" means an aromatic moiety containing the specified number of carbon atoms, such as to phenyl, tropone, indanyl, or naphthyl. "Alkylene" means a straight or branched chain, saturated, divalent aliphatic hydrocarbon group (e.g., methylene (—CH$_2$—) or, propylene (—(CH$_2$)$_3$—)).

"Cycloalkylene" means a divalent cyclic alkylene group, —C$_n$H$_{2n-x}$, wherein x represents the number of hydrogens replaced by cyclization(s). "Cycloalkenyl" means a monovalent group having one or more rings and one or more carbon-carbon double bond in the ring, wherein all ring members are carbon (e.g., cyclopentyl and cyclohexyl).

The prefix "halo" means a group or compound including one more of a fluoro, chloro, bromo, iodo, and astatino substituent. A combination of different halo groups (e.g., bromo and fluoro) can be present. In a embodiment only chloro groups are present.

The prefix "hetero" means that the compound or group includes at least one ring that is a heteroatom (e.g., 1, 2, or 3 heteroatom(s)), wherein the heteroatom(s) is each independently N, O, S, Si, or P.

"Substituted" means that the compound or group is substituted with at least one (e.g., 1, 2, 3, or 4) substituent independently selected from, a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl) a thiol (—SH), a thiocyano (—SCN), a tosyl (CH$_3$C$_6$H$_4$SO$_2$—), a C3 to C12 cycloalkyl, a C2 to C12 alkenyl, a C5 to C12 cycloalkenyl, a C6 to C12 aryl, a C7 to C13 arylalkylene, a C4 to C12 heterocycloalkyl, and a C3 to C12 heteroaryl instead of hydrogen, provided that the substituted atom's normal valence is not exceeded.

All ASTM tests are based on the 2003 edition of the Annual Book of ASTM Standards unless otherwise indicated.

The polyetherimides are of formula (1)

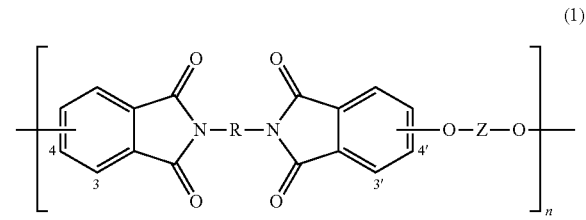

(1)

wherein n is greater than 1, for example 10 to 1,000 or more, or more specifically 10 to 500.

The group R in formula (1) is a substituted or unsubstituted divalent organic group, such as a $C_{6-20}$ aromatic hydrocarbon group or a halogenated derivative thereof, a straight or branched chain $C_{2-20}$ alkylene group or halogenated derivatives thereof, a $C_{3-8}$ cycloalkylene group or halogenated derivative thereof, or a divalent group of formula (2)

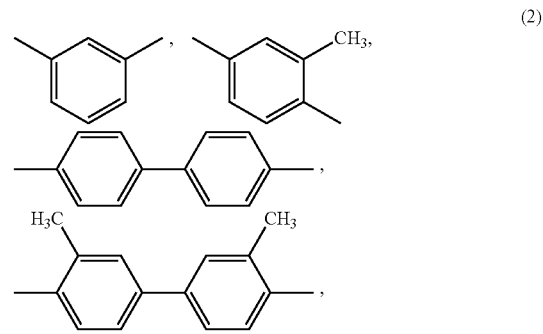

(2)

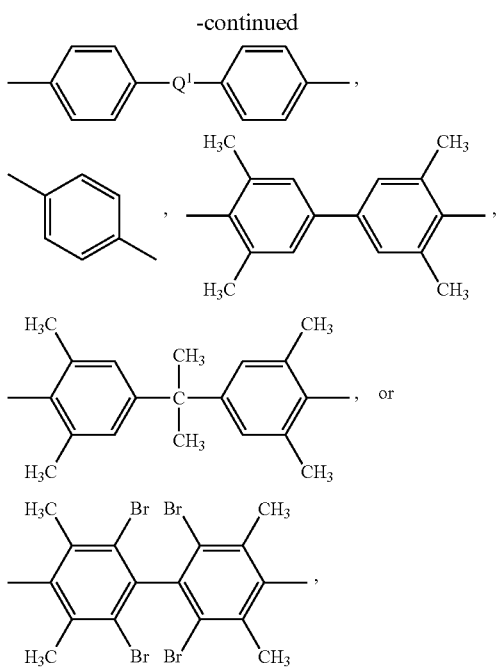

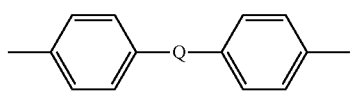

(3a)

wherein Q is —O—, —S—, —C(O)—, —SO$_2$—, —SO—, and —C$_y$H$_{2y}$— and a halogenated derivative thereof (including a perfluoroalkylene group) wherein y is an integer from 1 to 5. In a specific embodiment Z is derived from bisphenol A wherein Q is 2,2-isopropylidene.

In another specific embodiment, the polyetherimide comprises more than 1, specifically 10 to 1,000, or more specifically, 10 to 500 structural units, of formula (1) wherein R is a divalent group of formula (2) wherein Q$^1$ is —C$_y$H$_{2y}$— wherein y is an integer from 1 to 5 or a halogenated derivative thereof, and Z is a group of formula (3). In a specific embodiment, R is m-phenylene, p-arylene diphenylsulfone, or a combination thereof, and Z is 2,2-(4-phenylene)isopropylidene. For example, a polyetherimide sulfone comprises structural units of formula (1) wherein at least 50 mole % of the R groups are of formula (2) wherein Q$^1$ is —SO$_2$— and the remaining R groups are independently p-phenylene or m-phenylene or a combination comprising at least one of the foregoing; and Z is 2,2-(4-phenylene)isopropylidene.

The polyetherimide can be a copolymer, and combinations of polyetherimides can be used. In an embodiment, the polyetherimide optionally comprises additional structural imide units, for example imide units of formula (4)

wherein Q$^1$ is —O—, —S—, —C(O)—, —SO$_2$—, —SO—, and —C$_y$H$_{2y}$— and a halogenated derivative thereof (which includes perfluoroalkylene groups) wherein y is an integer from 1 to 5. In a specific embodiment R is a m-phenylene or p-phenylene.

The group Z in formula (1) is also a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded. Exemplary groups Z include groups derived from a dihydroxy compound of formula (3):

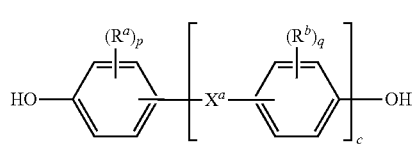

(3)

wherein R$^a$ and R$^b$ each represent a halogen atom or a monovalent hydrocarbon group and can be the same or different; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —S(O)$_2$—, —C(O)—, or a C$_{1-18}$ organic group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formulas (3a)

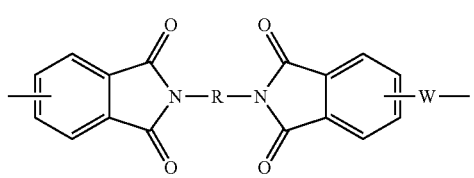

(4)

wherein R is as described in formula (1) and W is a linker of formulas (5)

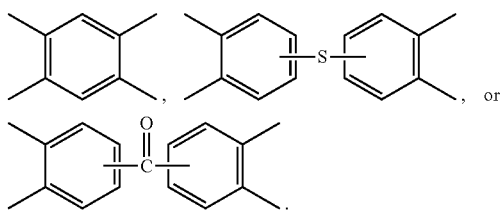

(5)

These additional structural imide units can be present in amounts ranging from 0 to 10 mole % of the total number of units, specifically 0 to 5 mole %, more specifically 0 to 2 mole %. In one embodiment no additional imide units are present in the polyetherimide.

The polyetherimides are prepared by the so-called "halo-displacement" or "chloro-displacement" method. In this method, a halophthalic anhydride of formula (6)

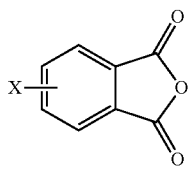

(6)

wherein X is a halogen, is condensed with an organic diamine of the formula (7)

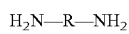

(7)

wherein R is as described in formula (1), to form a bis(halophthalimide) of formula (8).

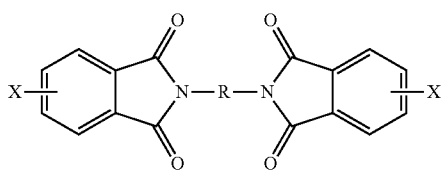

(8)

In an embodiment, X is a halogen, specifically fluoro, chloro, bromo, or iodo, more specifically chloro. A combination of different halogens can be used.

Illustrative examples of amine compounds of formula (7) include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis(p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)ether and 1,3-bis(3-aminopropyl)tetramethyldisiloxane. Combinations of these amines can be used. Illustrative examples of amine compounds of formula (7) containing sulfone groups include diamino diphenyl sulfone (DDS) and bis(aminophenoxy phenyl)sulfones (BAPS). Combinations comprising any of the foregoing amines can be used.

In a specific embodiment diamine (7) is a meta-phenylene diamine (7a) or a para-phenylene diamine (7b)

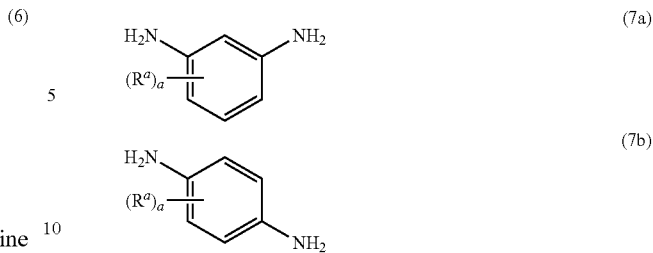

wherein $R^1$ and $R^2$ are each independently a halogen atom, nitro, cyano, $C_2$-$C_{20}$ aliphatic group, $C_2$-$C_{40}$ aromatic group, and a and b are each independently 0 to 4. Specific examples include meta-phenylenediamine (mDA), para-phenylenediamine (pDA), 2,4-diaminotoluene, 2,6-diaminotoluene, 2-methyl-4,6-diethyl-1,3-phenylenediamine, 5-methyl-4,6-diethyl-1,3-phenylenediamine, or 1,3-diamino-4-isopropylbenzene. Combinations comprising any of the foregoing amines can be used.

Condensation of halophthalic anhydride (6) and amine (7) (imidization) can be conducted in the absence or presence of a catalyst. Exemplary phase transfer catalysts for imidization include sodium phenyl phosphinate (SPP), acetic acid, hexaethylguanidinium chloride, benzoic acid, phthalic acid, or substituted derivatives thereof. In an embodiment, sodium phenyl phosphinate is used as the imidization catalyst. The catalyst, if used, is present in an amount effective to accelerate the reaction, for example about 0.1-0.3 wt. % based on the weight of diamine.

The reaction is generally conducted in the presence of a relatively non-polar solvent, preferably with a boiling point above about 100° C., specifically above about 150° C., for example o-dichlorobenzene, dichlorotoluene, 1,2,4-trichlorobenzene, diphenyl sulfone, a monoalkoxybenzene such as anisole, veratrole, diphenylether, or phenetole. Ortho-dichlorobenzene and anisole can be particularly mentioned.

The bis(halophthalimide)s (8) are generally prepared at least 110° C., specifically 150° to 275° C., more specifically 175 to 225° C. At temperatures below 110° C., reaction rates can be too slow for economical operation. Atmospheric or super-atmospheric pressures can be used, for example up to 5 atmospheres, to facilitate the use of high temperatures without causing solvent to be lost by evaporation.

The solvent, diamine (7), and halophthalic anhydride (6) can be combined in amounts such that the total solids content during the reaction to form bis(halophthalimide) (8) does not exceed about 40 wt. %, 25 wt. %, or about 17 wt. %. "Total solids content" expresses the proportion of the reactants as a percentage of the total weight comprising liquids present in the reaction at any given time.

A molar ratio of halophthalic anhydride (6) to diamine (7) of 1.98:1 to 2.04:1, specifically 2:1 is used. While other ratios can be employed, a slight excess of anhydride or diamine can be desirable. A proper stoichiometric balance between halophthalic anhydride (6) and diamine (7) is maintained to prevent undesirable by-products that can limit the molecular weight of the polymer, and/or result in polymers with amine end groups. Accordingly, in an embodiment, imidization proceeds adding diamine (7) to a mixture of halophthalic anhydride (6) and solvent to form a reaction mixture having a targeted initial molar ratio of halophthalic anhydride to diamine; heating the reaction mixture to a temperature of at least 100° C. (optionally in the presence of an imidization catalyst); analyzing the molar ratio of the heated reaction mixture to determine the actual initial molar ratio of halophthalic anhydride (6) to diamine (7); and, if necessary, adding halophthalic anhydride (6) or diamine (7) to the analyzed reaction mixture to adjust the molar ratio of halophthalic anhydride (6) to diamine (7) to 2.01 to 2.3.

After imidization, the halogen group X of bis(halophthalimide) (8)

(8)

is displaced by reaction with an alkali metal salt of a dihydroxy aromatic compound of formula (9)

MO—Z—OM  (9)

wherein M is an alkali metal and Z is as described in formula (1), to provide the polyetherimide of formula (1)

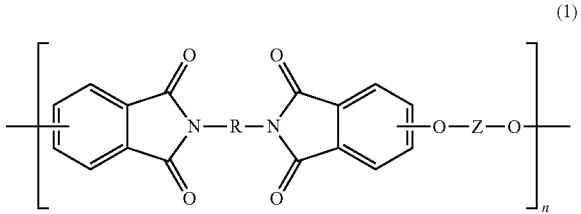
(1)

wherein n, R, and Z are as defined above.

The alkali metal M can be any alkali metal, and is typically potassium or sodium. The alkali metal salt can be obtained by reaction of the metal with an aromatic $C_{6-24}$ monocyclic or polycyclic dihydroxy compound optionally substituted with 1 to 6 $C_{1-8}$ alkyl groups, 1 to 8 halogen atoms, or a combination thereof, for example a compound of formula (3), more specifically a dihydroxy compound corresponding to one of the groups of formulas (3a), and still more specifically a bisphenol compound of formula (10):

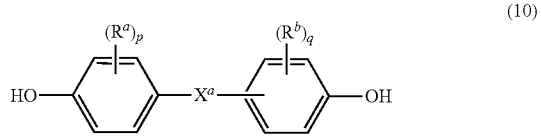
(10)

wherein $R^a$, $R^b$, and $X^a$ are as described in formula (3). For example, 2,2-bis(4-hydroxyphenyl)propane ("bisphenol A" or "BPA") can be used.

Polymerization by reaction of bis(halophthalimide) (8) with alkali metal salt (9) can be conducted in the presence or absence of phase transfer catalyst that is substantially stable under the reaction conditions used, in particular temperature. Exemplary phase transfer catalysts for polymerization include hexaalkylguanidinium and α,ω-bis(pentaalkylguanidinium)alkane salts. Both types of salts can be referred to herein as "guanidinium salts."

Polymerization is generally conducted in the presence of a relatively non-polar solvent, preferably with a boiling point above about 100° C., specifically above about 150° C., for example o-dichlorobenzene, dichlorotoluene, 1,2,4-trichlorobenzene, diphenyl sulfone, a monoalkoxybenzene such as anisole, veratrole, diphenylether, or phenetole. Ortho-dichlorobenzene and anisole can be particularly mentioned. Alternatively, a polar aprotic solvent can be used, illustrative examples of which include dimethylformamide (DMF), dimethylacetamide (DMAc), dimethylsulfoxide (DMSO), and N-methylpyrrolidinone (NMP). A combination comprising at least one of the foregoing solvents can be used.

Polymerization can be conducted at a temperature of at least 110° C., specifically 150° to 275° C., more specifically 175 to 225° C. At temperatures below 110° C., reaction rates can be too slow for economical operation. Atmospheric or super-atmospheric pressures can be used, for example up to 5 atmospheres, to facilitate the use of high temperatures without causing solvent to be lost by evaporation.

In an embodiment, alkali metal salt (9) is added to the organic solvent and the water is removed from the mixture, for example as its azeotrope. The bis(halophthalimide) (8) is then added and water removed from the mixture, for example as its azeotrope, followed by addition of a catalyst in a pre-dried solution in organic solvent. Water removal from the system can be accomplished in either batch, semi-continuous or continuous processes using means known in the art such as a distillation column in conjunction with one or more reactors. In an embodiment, a mixture of water and non-polar organic liquid distilling from a reactor is sent to a distillation column where water is taken off overhead and solvent is recycled back into the reactor at a rate to maintain or increase the desired solids concentration. Other methods for water removal include passing the condensed distillate through a drying bed for chemical or physical adsorption of water.

The molar ratio of the bis(halophthalimide) (8) to the alkali metal salt (9) can be about 1.0:0.9 to 0.9:1.0. A solids content of the bis(halophthalimide) (8) in the polymerization can be 15 to 60 wt. %, based on the total weight of the polymerization mixture.

Thus, a method for the manufacture of the polyetherimides from the bis(halophthalimide) composition comprises reacting, in the presence of a catalytically active amount of a phase transfer catalyst, the alkali metal salt (9) with a bis(halophthalimide) (8). It has been discovered by the inventors hereof that desirable properties of the polyetherimide can be obtained by careful selection of the regioisomers of the bis(halophthalimide)s (8) used to manufacture the polyetherimides. In particular, the bis(halophthalimide)s (8) can be formed from the 3-halophthalic anhydride (6a) and/or the 4-halophthalic anhydride (6b)

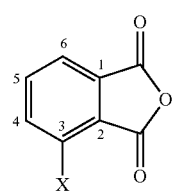
(6a)

-continued

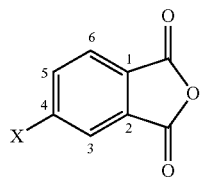

(6b)

to provide the 3,3'-bis(halophthalimide) (8a), the 3,4'-bis(halophthalimide) (8b), and/or the 4,4'-bis(halophthalimide) (8c).

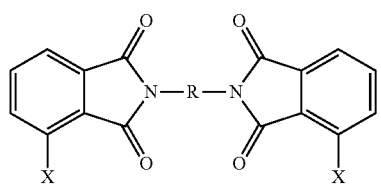

(8a)

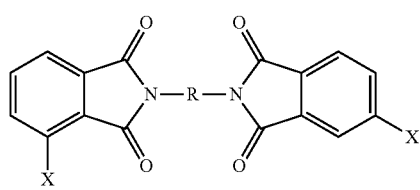

(8b)

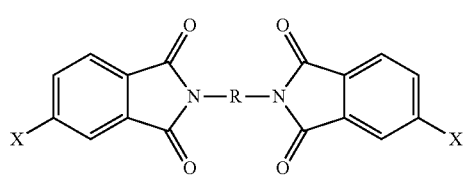

(8c)

As can be seen from formula (8b), when R is symmetrical (e.g., a 1,3-phenylene or 1,4-phenylene) the 3,4'- and 4,3' isomers are the same, but when R is not symmetrical (e.g., 1-methyl-2,3-phenylene) the 3,4' and 4,3' regioisomers are not the same. Reference to the 3,4' isomer herein and in the claims specifically includes the 4,3' isomer irrespective of whether R is symmetrical. In a specific embodiment, a combination of 3-chlorophthalic anhydride (3-ClPA), 4-chlorophthalic anhydride (4-ClPA) and a diamine (7) (e.g., meta-phenylene diamine as shown in the Figure) are reacted to produce the bis(chlorophthalimide) (ClPAMI) composition as a mixture of the 3,3'-bis(chlorphthalimide) (3,3-ClPAMI) (in FIG. 1, 1,3-bis[N-(3-chlorophthalimido)]benzene), the 3,4'-bis(chloropthalimide) (3,4'-ClPAMI) (in FIG. 1, 1,3-bis[N-(3-chlorophthalimido, 4-chlorophthalimido)]benzene,), and the 4,4'-bis(chloropthalimide) (4,4'-ClPAMI) (in FIG. 1, 1,3-bis[N-(4-chlorophthalimido)]benzene).

Figure 2:
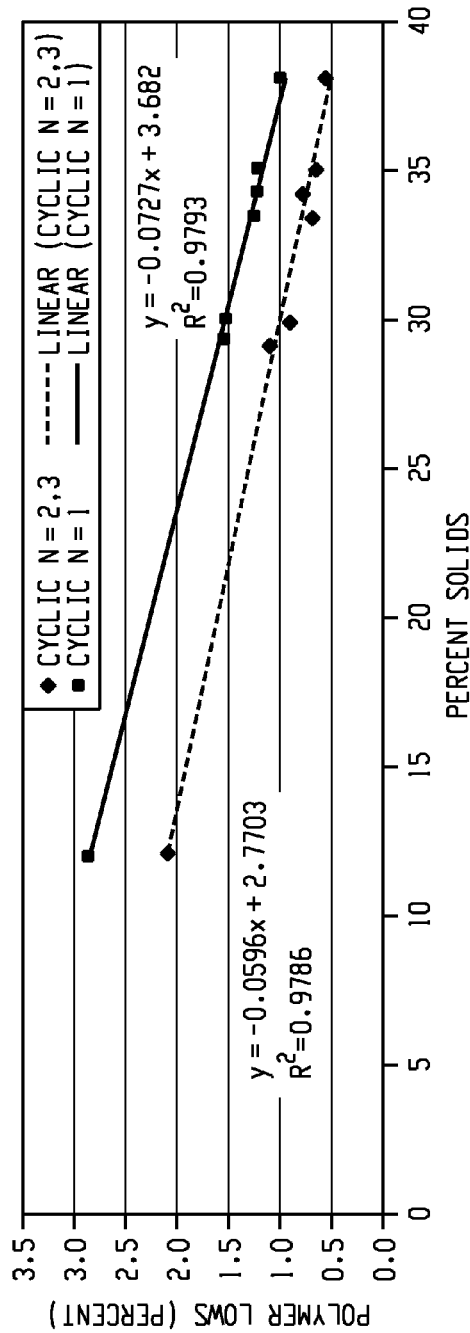
FIG. 2 is a graph showing the effect of the weight percent of solids in the polymerization reaction on the concentration of the cyclic n=1 byproduct.

Without being bound by theory, it is believed that the solubility of the 3,4'-bis(halophthalimide) (8b), (e.g., the 3,4-ClPAMI isomer) is about ten-fold greater than the 3,3-bis(halophthalimide) and the 4,4'-bis(halophthalimide) (including the 3,3'- and 4,4'-ClPAMI isomers). Increasing the concentration of the 3,4'-bis(halophthalimide) (8b) allows the weight percent of solids of the reaction to be increased from 30 wt. % to 60 wt. %. As shown in FIG. 2, when the weight percent of solids is increased from 30 to 45 wt. %, the cyclic n=1 byproduct decreases from 1.5 wt. % to 0.75 wt. %. Increasing the amount of the 3,4'-bis(halophthalimide) (8b) in the polyetherimide product can adversely affect the modulus and ductility of the polyetherimide product, but this in turn can be remedied by increasing the molecular weight of the polymer. An increase in the molecular weight of the polymer could ordinarily result in processing issues, but such issues are avoided here because the polymer product has improved flow.

Thus, the polyetherimides are manufactured from a bis(halophthalimide) composition, specifically the bis(chloropthalimide) composition, comprising the 3,3'-bis(halophthalimide) (8a), specifically 3,'3-ClPAMI, in an amount of at least 15 wt. %, specifically 15 to less than 85 wt. %, more specifically 17 to 80 wt. %, or 19 to 75 wt. %, based on the total weight of the bis(halophthalimide) composition. In another embodiment, the bis(halophthalimide) composition comprises 15 to less than 53 wt. %, specifically 17 to 51 wt. %, more specifically 19 to 49 wt. % of 3,3'-bis(halophthalimide) (8a), specifically 3,3'-ClPAMI, based on the weight of the bis(halophthalimide) composition.

The bis(halophthalimide) composition, specifically the bis(chloropthalimide) composition, also further comprises the 4,3'-bis(halophthalimide) (8b), specifically 3,4'-ClPAMI, in an amount of more than 10 wt. %, specifically more than 10 wt. % to less than 85 wt. %, or more than 17 wt. % to less than 85 wt. %, or 18 to 84 wt. %, or 19 to 82 wt. %, or 25 to 80 wt. %, or 30 to 78 wt. %, based on the total weight of the bis(halophthalimide) composition. Alternatively, the bis(halophthalimide) composition comprises 50 to 85 wt. %, or 68 to 85 wt. % of 4,3'-bis(halophthalimide) (8b), specifically 3,4'-ClPAMI, based on the total weight of the bis(halophthalimide) composition. In another embodiment, the bis(halophthalimide) composition comprises more than 47 to less than 85 wt. %, or 49 to 80 wt. %, or 51 to 75 wt. % of the 4,3'-bis(halophthalimide) of formula (8b), specifically 3,4'-ClPAMI, based on the weight of the bis(halophthalimide) composition.

Also, the bis(halophthalimide) composition, specifically the bis(chloropthalimide) composition, comprises the 4,4'-bis(halophthalimide) (8c), specifically 4,4'-ClPAMI, in an amount of from more than 0 to less than 27 wt. %, specifically 1 to 26 wt. %, or 2 to 24 wt. %, or 3 to 20 wt. %, based on the weight of the bis(halophthalimide) composition.

Figure 3:
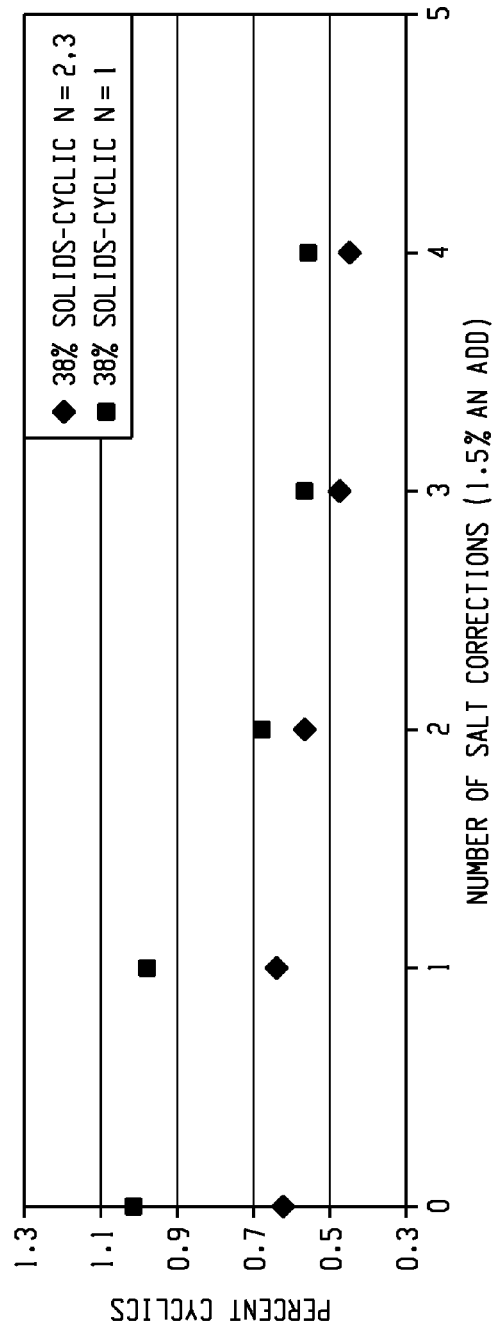
FIG. 3 is a graph showing the effect of sequential addition of an alkali metal salt on the concentration of the cyclic n=1, n=2, and n=3 byproducts.

The cyclic n=1 byproduct can be further reduced, and a higher molecular weight polymer product obtained, by first targeting a low molecular weight, and then performing at least one, at least two, or at least three "corrections" of the alkali metal salt (e.g., Na$_2$BPA) as shown in FIG. 3. When reaction is performed at 38% solids, the cyclic n=1 byproduct is approximately 1%. When two additions of the alkali metal salt are performed to adjust to the desired molecular weight, the amount of the cyclic n=1 byproduct is further reduced to 0.6%, although the amounts of the cyclic byproducts n=2 and n=3 are not reduced. Without being bound by theory, it is believed that the reduction of the cyclic n=1 byproduct occurs because it is a kinetic product formed early in the polymerization when there is large concentration of the 3,3-bis(halophthalimide) isomer (8a), but as concentration of the 3,3-bis(halophthalimide) isomer (8a) is decreased by reaction to form the polyetherimide backbone, cyclic n=1 byproduct undergoes a reversible reaction to the 3,3'-isomer, which is subsequently reacted into the backbone of the polyetherimide.

Thus, in a method for the manufacture of the polyetherimides, a first portion of the alkali metal salt of the dihydroxy aromatic compound is reacted with the bis(halophthalimide) composition to form a first polyetherimide having a first molecular weight; and a second portion of the alkali metal salt of the dihydroxy aromatic compound is added to the first polyetherimide to form a second polyetherimide having a second molecular weight higher than the first molecular weight. In another embodiment, a third portion of the alkali metal salt of the dihydroxy aromatic compound is added to the second polyetherimide to form a third polyetherimide having a third molecular weight higher than the second molecular weight. In still another embodiment, a fourth portion of the alkali metal salt of the dihydroxy aromatic compound is added to the third polyetherimide to form a fourth polyetherimide having a fourth molecular weight higher than the third molecular weight. In order to minimize the concentration of cyclic n=1 byproduct, reactants and reaction conditions, in particular 26, 50 and 24 wt. % of 3,3'-C1PAMI, 3,4-C1PAMI, and 4,4'-C1PAMI respectively, and a salt to C1PAMI ratio of 0.94 to 0.95 are selected to initially produce a polymer product having an Mw of 25,000 to 35,000 amu. The reaction mixture containing this product is then subjected to 1 to 5, specifically 1 to 3, or 1 to 2 corrections by the addition of additional alkali metal salt, in order to produce a polymer having an Mw of 50,000 to 60,000 amu.

The polyetherimides manufactured using the bis(halophthalimide) compositions as described above can have a heat deflection temperature of at least 218° C., specifically at least 22335° C., more specifically 230° C., when determined in accordance with ASTM 648 on a molded sample.

Also, the polyetherimide can have a heat deflection temperature at least 10° C. higher, specifically at least 12° C. higher, more specifically at least 14° C. higher than a heat deflection temperature of the same polyetherimide manufactured using a bis(halophthalimide) composition comprising more than 10 wt. % of the 4,3'-bis(halophthalimide), each determined in accordance with ASTM 648 at 0.455 megaPascals (mPa) stress and at 3.2 millimeters (mm) thickness on a molded sample. In a specific embodiment, the polyetherimide has a heat deflection temperature at least 10° C. higher, specifically at least 12° C. higher, more specifically at least 14° C. higher than the heat deflection temperature of the same polyetherimide manufactured using the bis(halophthalimide) composition comprising less than 10 wt. % of the 4,3'-bis (halophthalimide) and more than 27 wt. % of the 4,4'-bis (halophthalimide), each determined in accordance with ASTM 648 at 0.455 mPa stress and at 3.2 mm thickness on a molded sample. In another specific embodiment, the polyetherimide has a heat deflection temperature at least 10° C. higher, specifically at least 12° C. higher, more specifically at least 14° C. higher than the heat deflection temperature of the same polyetherimide manufactured using the bis(halophthalimide) composition comprising less than 10 wt. % of the 4,3'-bis(halophthalimide) and more than 15 wt. % of the 4,4'-bis(halophthalimide), each determined in accordance with ASTM 648 at 0.455 mPa stress and at 3.2 mm thickness on a molded sample.

In addition, the polyetherimide can have at least 10% higher, at least 15% higher, more specifically at least 20% higher stiffness than a stiffness of the same polyetherimide manufactured using a bis(halophthalimide) composition comprising more than 10 wt. % of the 4,3'-bis(halophthalimide), each determined by dynamic mechanical analysis (DMA) over 30° C. to 210° C. on a molded sample. In specific embodiment, the polyetherimide can have at least 10% higher, specifically at least 15% higher, more specifically at least 20% higher stiffness than the stiffness of the same polyetherimide manufactured using the bis(chlorophthalimide) composition comprising less than 10 wt. % of the 4,3'-bis (halophthalimide) and more than 27 wt. % of the 4,4'-bis (halophthalimide), each determined by DMA over 30° C. to 210° C., on a molded sample. In another specific embodiment, the polyetherimide can have at least 10% higher, specifically at least 15% higher, more specifically at least 20% higher stiffness than the stiffness of the same polyetherimide manufactured using the bis(chlorophthalimide) composition comprising less than 10 wt. % of the 4,3'-bis(halophthalimide) and more than 15 wt. % of the 4,4'-bis(halophthalimide), each determined by DMA over 30° C. to 210° C., on a molded sample.

Also, the polyetherimide can have a ratio of a high shear rate viscosity to a low shear rate viscosity that is at least 30% higher, specifically at least 35% higher, more specifically at least 40% higher than the same ratio of the same polyetherimide manufactured using the bis(halophthalimide) composition comprising more than 10 wt. % of the 4,3'-bis(halophthalimide), each determined by parallel plate rheometry. In a specific embodiment, the polyetherimide can have a ratio of a high shear rate viscosity to a low shear rate viscosity that is at least 30% higher, specifically at least 35% higher, more specifically at least 40% higher than the same ratio of the same polyetherimide manufactured using the bis(halophthalimide) composition comprising less than 10 wt. % of the 4,3'-bis (halophthalimide) and more than 27 wt. % of the 4,4'-bis (halophthalimide), each determined by parallel plate rheometry. In another specific embodiment, the polyetherimide can have a ratio of a high shear rate viscosity to a low shear rate viscosity that is at least 30% higher, specifically at least 35% higher, more specifically at least 40% higher than the same ratio of the same polyetherimide manufactured using the bis(halophthalimide) composition comprising less than 10 wt. % of the 4,3'-bis(halophthalimide) and more than 15 wt. % of the 4,4'-bis(halophthalimide), each determined by parallel plate rheometry.

The polyetherimides manufactured using the above-described bis(halophthalimide) composition have the —O—Z—O— groups in the polyetherimide in the 3,3', 3,4', 4,3', and 4,4' positions in the same or substantially the same ratio as in the bis(halophthalimide) compositions. In an embodiment, the polyetherimide is of formula (1)

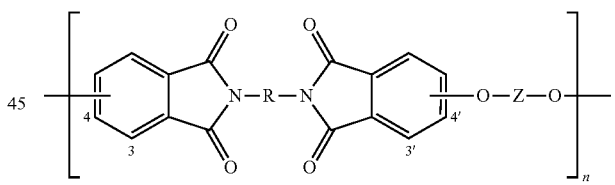

wherein n, R, and Z are as defined above. In addition, based on the total mole percent of the —O—Z—O— groups in the polyetherimide, the polyetherimides have more than more than 0 to less than 15 mole percent of the —O—Z—O— groups in the 3,3' position, more than 17 less than 85 mole percent of the —O—Z—O— groups in the 3,4', and 4',3 positions, specifically more than 47 wt. % to less than 85 wt. % of the —O—Z—O— groups in the 3,4', and 4',3 positions, and from more than 0 to less than 27 mole percent of the divalent bonds of the —O—Z—O— groups in the 4,4' position. In an embodiment the polyetherimide has from 15 to less than 85 mol % of the of the —O—Z—O— groups in the 3,3' position, from more than 47 to less than 85 mol % of the O—Z—O— groups in the 4,3' and 3,4' positions, and from more than 0 to less than 27 mol % of the O—Z—O— groups in the 4,4' position. In another embodiment, based on the total mole percent of the —O—Z—O— groups in the polyetherimide, the polyetherimide has at least 15 mol % the divalent bonds of the —O—Z—O— groups are in the 3,3' position, more than 10 mol % of the —O—Z—O— groups are in the 3,4', and 4',3 positions, and less than 27 mol % of the —O—Z—O— groups are 4,4' position. Other mole percents, reflective of the weight percents in the bis(halophthalimide) compositions disclosed herein, can be used. Of course, these polyetherimides can have any one or more of the properties and characteristics described herein.;

The polyetherimides manufactured using the above-described bis(halophthalimide) composition can comprise, based on parts by weight of the polyetherimide, less than 100 parts per million (ppm), specifically less than 80 ppm, more specifically less than 60 ppm each of the 3,3'-bis(halophthalimide), the 4,3'-bis(halophthalimide), and the 4,4'-bis(halophthalimide). In addition, the polyetherimide can comprise, based on parts of the polyetherimide, less than 100 ppm, specifically less than 80 ppm, more specifically less than 60 ppm of a halo(bisphthalimide) of the formula

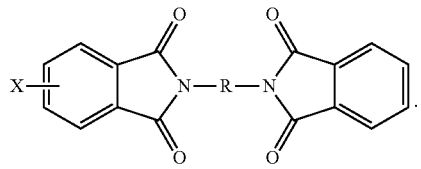

In addition, the polyetherimide can comprise, based on parts of the polyetherimide, less than 100 ppm, specifically less than 80 ppm, more specifically less than 60 ppm of a bisphthalimide of the formula

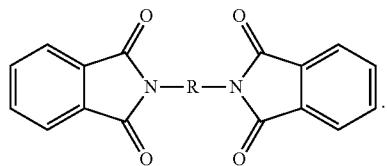

Also, the polyetherimide can comprise, based on parts of the polyetherimide, less than 200 ppm, specifically less than 180 ppm, more specifically less than 160 ppm of a total of the 3,3'-bis(halophthalimide), the 4,3'-bis(halophthalimide), the 4,4'-bis(halophthalimide), and the halo(bisphthalimide).

In a further advantageous feature, the polyetherimides have reduced levels of the cyclic n=1 byproduct arising from the intramolecular reaction of the alkali metal salt (9) and the bis(halophthalimide)s (8). In an embodiment, the polyetherimides manufactured as described above comprises, based on parts of the polyetherimide, less than 1.5 wt. %, specifically less than 1.1 wt. %, more specifically less than 0.6 wt. % of the cyclic n=1 adduct of the alkali metal salt (9) and the bis(halophthalimide) (8), specifically the 3,3' bis(halophthalimide). In a specific embodiment wherein X is Cl, the polyetherimide comprises, based on parts of the polyetherimide, less than 1.5 wt. %, specifically less than 1.1 wt. %, more specifically less than 0.6 wt. % of the cyclic n=1 adduct of the alkali metal salt (9) and the bis(chlorophthalimide) (8).

The polyetherimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the polystyrene standard weight averaged molecular weight (Mw).

The polyetherimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyetherimides can have a glass transition temperature of greater than 180° C., specifically of 200° C. to 315° C., as measured using differential scanning calorimetry (DSC) per ASTM test D3418. In an embodiment the polyetherimide has a glass transition temperature of 220 to 240° C.

The polyetherimides can have a melt index of 0.1 to 10 grams per minute (g/min), as measured by American Society for Testing Materials (ASTM) DI 238 at 320 to 370° C., more specifically at 337° C. using a 6.1 kilogram (kg) weight.

The compositions can further optionally comprise a reinforcing filler, for example a flat, plate-like, and/or fibrous filler. Typically, the flat, plate-like filler has a length and width at least ten times greater than its thickness, where the thickness is from 1 to 1000 micrometers (μm). Exemplary reinforcing fillers of this type include glass flakes, mica, flaked silicon carbide, aluminum diboride, aluminum flakes, and steel flakes; wollastonite comprising surface-treated wollastonite; calcium carbonate comprising chalk, limestone, marble and synthetic, precipitated calcium carbonates, generally in the form of a ground particulates; talc, comprising fibrous, modular, needle shaped, and lamellar talc; kaolin, comprising hard, soft, calcined kaolin, and kaolin comprising various coatings known in the art to facilitate compatibility with the polymeric matrix resin; mica; and feldspar.

Exemplary reinforcing fillers also include fibrous fillers such as short inorganic fibers, natural mineral fibrous fillers, single crystal fibers, glass fibers, ceramic fibers, and organic reinforcing fibrous fillers. Short inorganic fibers include, borosilicate glass, carbon fibers, and those derived from blends comprising at least one of aluminum silicates, aluminum oxides, magnesium oxides, and calcium sulfate hemihydrate. Single crystal fibers or "whiskers" include silicon carbide, alumina, boron carbide, iron, nickel, and copper single crystal fibers. Glass fibers, comprising glass fibers such as E, ECR, S, and NE glasses and quartz, and the like can also be used.

Such reinforcing fillers can be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical cowoven structures include glass fiber-carbon fiber, carbon fiber-aromatic polyimide (aramid) fiber, and aromatic polyimide fiber-glass fiber. Fibrous fillers can be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, performs and braids.

The reinforcing fibers can have a diameter of 5 to 25 micrometers, specifically diameters of 9 to 15 micrometers. In preparing molding compositions it is convenient to use reinforcing fibers such as fiberglass in the form of chopped strands of from 3 millimeters to 15 millimeters long. In articles molded from these compositions, on the other hand, shorter lengths will typically be encountered because during compounding considerable fragmentation can occur. Combinations of rigid fibrous fillers with flat, plate-like fillers can be used, for example to reduce warp of a molded article.

In some applications it can be desirable to treat the surface of the filler with a chemical coupling agent to improve adhesion to a thermoplastic resin in the composition. Examples of useful coupling agents are alkoxy silanes and alkoxy zirconates Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The amount of reinforcing filler used in the polyetherimide compositions can vary widely, and is that amount effective to provide the desired physical properties and flame resistance. In some instances the reinforcing filler is present in an amount from more than 10 to 60 wt. %, more specifically 15 to 40 wt. %, and even more specifically 20 to 35 wt. %, each based on the total weight of the composition.

The polyetherimide compositions can optionally further comprise one or more other types of particulate fillers. Exemplary particulate fillers include silica powder, such as fused silica and crystalline silica; boron-nitride powder and boron-silicate powders; alumina, and magnesium oxide (or magnesia); silicate spheres; flue dust; cenospheres; aluminosilicate (armospheres); natural silica sand; quartz; quartzite; perlite; tripoli; diatomaceous earth; synthetic silica; and combinations thereof. All of the above fillers can be surface treated with silanes to improve adhesion and dispersion with the polymeric matrix resin. When present, the amount of additional particulate filler in the polyetherimide composition can vary widely, and is that amount effective to provide the desired physical properties and flame resistance. In some instances the particulate filler is present in an amount from 1 to 80 wt. %, specifically 5 to 30 wt. %, more specifically 5 to 20 wt. %, each based on the total weight of the composition.

The polyetherimide compositions can include various additives ordinarily incorporated into polymer compositions of this type, with the proviso that any additive is selected so as to not significantly adversely affect the desired properties of the composition. Exemplary additives include catalysts (for example, to facilitate reaction between an impact modifier and the polyester), antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame resistances, anti-drip agents, and radiation stabilizers. Combinations of additives can be used. The foregoing additives (except any fillers) are generally present in an amount from 0.005 to 20 wt. %, specifically 0.01 to 10 wt. %, based on the total weight of the composition.

Suitable antioxidants can be compounds such as phosphites, phosphonites and hindered phenols or mixtures thereof. Phosphorus-containing stabilizers comprising triaryl phosphites and aryl phosphonates are useful additives. Difunctional phosphorus containing compounds can also be unseeded. Preferred stabilizers can have a molecular weight greater than or equal to 300. Some exemplary compounds are tris-di-tert-butylphenyl phosphite available from Ciba Chemical Co. as IRGAPHOS 168 and bis(2,4-dicumylphenyl)pentaerythritol diphosphite available commercially from Dover Chemical Co. as DOVERPHOS S-9228.

Examples of phosphites and phosphonites include: triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butyl-phenyl) 4,4'-biphenylene diphosphonite, bis(2,4-di-tert-butyl-6-methylphenyl)methyl phosphite, bis(2,4-di-tert-butyl-6-methylphenyl)ethyl phosphite, 2,2',2''-nitrilo[triethyl tris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite and 5-butyl-5-ethyl-2-(2,4,6-tri-tert-butylphenoxy)-1,3,2-dioxaphosphirane.

Combinations comprising more than one organophosphorous compound are contemplated. When used in combination the organophosphorous compounds can be of the same type or different types. For example, a combination can comprise two phosphites or a combination can comprise a phosphite and a phosphonite. In some embodiments, phosphorus-containing stabilizers with a molecular weight greater than or equal to 300 are useful. Phosphorus-containing stabilizers, for example an aryl phosphite, may be present in the composition in an amount from 0.005 to 3 wt. %, specifically 0.01 to 1.0 wt. %, based on total weight of the composition.

Hindered phenols can also be used as antioxidants, for example alkylated monophenols, and alkylated bisphenols or poly phenols. Exemplary alkylated monophenols include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol and mixtures thereof. Exemplary alkylidene bisphenols include 2,2'-methylenebis(6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha,alpha-dimethylbenzyl)-4-nonylphenol], 4,4'-methylenebis-(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane and mixtures thereof.

The hindered phenol compound can have a molecular weight of greater than or equal to 300 g/mole. The high molecular weight can help retain the hindered phenol moiety in the polymer melt at high processing temperatures, for example greater than or equal to 300° C. Hindered phenol stabilizers, are usually present in the composition in an amount from 0.005 to 2 wt. %, specifically 0.01 to 1.0 wt. %, based on total weight of the composition.

Examples of mold release agents include both aliphatic and aromatic carboxylic acids and their alkyl esters, for example, stearic acid, behenic acid, pentaerythritol tetrastearate, glycerin tristearate, and ethylene glycol distearate. Polyolefins such as high-density polyethylene, linear low-density polyethylene, low-density polyethylene and similar polyolefin homopolymers and copolymers can also be used a mold release agents. Mold release agents are typically present in the composition at 0.05 to 10 wt. %, based on total weight of the composition, specifically 0.1 to 5 wt. %. Preferred mold release agents will have high molecular weight, typically greater than 300, to prevent loss of the release agent from the molten polymer mixture during melt processing.

In particular, an optional polyolefin can be added to modify the chemical resistance characteristics and mold release characteristics of the composition. Homopolymers such as polyethylene, polypropylene, polybutene can be used either separately or in combination. Polyethylene can be added as high-density polyethylene (HDPE), low-density polyethylene (LDPE) or branched polyethylene. Polyolefins can also be used in copolymeric form with compounds containing carbonic acid radicals such as maleic acid or citric acid or their anhydrides, acid compounds containing acrylic acid radicals such as acrylic acid ester, and the like, as well as combinations comprising at least one of the foregoing. When present, the polyolefin, in particular HDPET, is used in an amount from more than 0 to 10 wt. %, specifically 0.1 to 8 wt. %, more specifically from 0.5 to 5 wt. %, all based on the total weight of the composition.

In some embodiments, the compositions can further include at least one additional polymer. Examples of such additional polymers include and are not limited to PPSU (polyphenylene sulfone), polyetherimides, PSU (polysulfone), PPET (polyphenylene ether), PFA (perfluoroalkoxy alkane), MFA (co-polymer of TFE tetrafluoroethylene and PFVE perfluorinated vinyl ether), FEP (fluorinated ethylene propylene polymers), PPS (poly(phenylene sulfide), PTFE (polytetrafluoroethylene), PA (polyamide), PBI (polybenzimidizole) and PAI (poly(amide-imide)), poly(ether sulfone), poly(aryl sulfone), polyphenylenes, polybenzoxazoles, polybenzthiazoles, as well as blends and co-polymers thereof. When present, the polymer is used in an amount from more than 0 to 20 wt. %, specifically 0.1 to 15 wt. %, more specifically from 0.5 to 10 wt. %, all based on the total weight of the composition. In an embodiment, no polymer other than the polyetherimide as described herein is present in the composition.

Colorants such as pigment and/or dye additives can also optionally be present. Useful pigments can include, for example, inorganic pigments such as metal oxides and mixed metal oxides such as zinc oxide, titanium dioxide, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amount from 0 to 10 wt. %, specifically 0 to 5 wt. %, based on the total weight of the composition. In some instances, where improved impact is desired pigments such as titanium dioxide will have a mean particle size of less than 5 µm.

The composition can also optionally include a fluoropolymer in an effective amount to provide anti-drip or other beneficial properties to the resin composition. In one instance the fluoropolymer is present in an amount 0.01 to 5.0 wt. % of the composition. Examples of suitable fluoropolymers and methods for making such fluoropolymers are set forth, for example, in U.S. Pat. Nos. 3,671,487, 3,723,373, and 3,383,092. Suitable fluoropolymers include homopolymers and copolymers that comprise structural units derived from one or more fluorinated alpha-olefin monomers, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$ and $CF_3CF=CH_2$.

Copolymers comprising structural units derived from two or more fluorinated alpha-olefin monomers can also be used, for example poly(tetrafluoroethylene-hexafluoroethylene), as well as copolymers comprising structural units derived from one or more fluorinated monomers and one or more non-fluorinated monoethylenically unsaturated monomers that are copolymerizable with the fluorinated monomers such as poly(tetrafluoroethylene-ethylene-propylene) copolymers. Suitable non-fluorinated monoethylenically unsaturated monomers include for example, alpha-olefin monomers such as ethylene, propylene, butene, acrylate monomers such as, methyl methacrylate, butyl acrylate, and the like, with poly(tetrafluoroethylene) homopolymer (PTFE) preferred.

The fluoropolymer can be pre-blended in some manner with a polymer such as an aromatic polycarbonate or polyetherimide resin. For example, an aqueous dispersion of fluoropolymer and a polycarbonate resin can be steam precipitated to form a fluoropolymer concentrate for use as a drip inhibitor additive in thermoplastic resin compositions, as disclosed, for example, in U.S. Pat. No. 5,521,230. Alternatively, the fluoropolymer can be encapsulated.

In some instances it is desired to have polyetherimide compositions that are essentially free of bromine and chlorine. "Essentially free" of bromine and chlorine means that the composition has less than 3 wt. % of bromine and chlorine, and in other embodiments less than 1 wt. % bromine and chlorine by weight of the composition. In other embodiments, the composition is halogen free. "Halogen free" is defined as having a halogen content (total amount of fluorine, bromine, chlorine and iodine) of less than or equal to 1000 parts by weight of halogen per million parts by weight of the total composition (ppm). The amount of halogen can be determined by ordinary chemical analysis such as atomic absorption.

The polyetherimide compositions can be prepared by blending the ingredients under conditions for the formation of an intimate blend. Such conditions often include melt mixing in single or twin screw type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the polyetherimide polymers prior to melting. The melt processing is often done at 290 to 370° C. to avoid excessive polymer degradation while still allowing sufficient melting to get an intimate polymer mixture free of any unbelted components. The polymer blend can also be melt filtered using a 40 to 100 micrometer candle or screen filter to remove undesirable black specks or other heterogeneous contaminants.

In an exemplary process, the various components are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

The composition can then be molded in any equipment conventionally used for thermoplastic compositions, such as a Newbury or van Dorn type injection-molding machine with conventional cylinder temperatures, at 320° C. to 420° C., and conventional mold temperatures at 100° C. to 170° C.

The physical properties of the when the polyetherimide composition can be varied to achieve the desired performance properties. In some embodiments, when the polyetherimide composition is exposed to a temperature of 110° C. for 10 days under steam and under pressure, the composition has a melt flow rate increase that is less than 100% greater than a melt flow rate of the composition at 0 days steam and pressure exposure, optionally where the compositions has less than 100 ppm by weight of the composition of a sodium aryl phosphinate salt. Melt flow can be measured in accordance with ASTM D1238 at 337° C. with 6.7 Kg.

In another embodiment, the polyetherimide composition retains at least 60% of the initial tensile strength at yield of the composition, after exposure to 110° C. steam for 20 days, optionally where the compositions has less than 100 ppm by weight of the composition of a sodium aryl phosphinate salt. The initial tensile strength of the composition at yield can be from 0 to 120 MPa.

The physical properties of the composition can be varied to achieve the desired performance properties. In some embodiments the polyetherimide composition has a melt viscosity of 50 to 20,000 Pascal-seconds, 100 to 15,000 Pascal-seconds, or more specifically, 50 to 10,000 Pascal-seconds at 380° C. as measured by ASTM method D3835 using a capillary rheometer with a shear rate of 100 to 10,000 1/sec.

In another embodiment, the polyetherimide composition can have heat deflection temperature (HDT) of greater than or equal to 190° C., specifically 2000° C. to 230° C., measured according to ASTM D648 on a 3.2 mm bar at 0.46 MPa (66 psi).

The composition can have a tensile strength greater than or equal to 100 MPa, specifically 100 To 120 MPa, measured in accordance with ASTM D648.

The polyetherimide composition can have a melt flow rate (MFR) at 337° C. of greater than 10 grams per 10 minutes, when measured in accordance with ASTM D1238 at 295° C. using a 6.7 Kg weight.

In a specific embodiment, wherein the bis(halophthalimide) composition comprises at least 15 wt. % of a 3,3'-bis (halophthalimide), from more than 17 wt. % to less than 85 wt. % of a 4,3'-bis(halophthalimide), and from more than 0 to less than 27 wt. % of a 4,4'-bis(halophthalimide), the polyetherimide manufactured from the composition has a heat deflection temperature of at least 218° C., determined in accordance with ASTM 648 on a molded sample, a heat deflection temperature at least 10° C. higher than a heat deflection temperature of the same polyetherimide manufactured using a bis(halophthalimide) composition comprising more than 10 wt. % of the 4,3'-bis(halophthalimide), each determined in accordance with ASTM 648 at 0.455 megaPascals stress and at 3.2 millimeters thickness on a molded sample, at least 10% higher stiffness than a stiffness of the same polyetherimide manufactured using the bis(halophthalimide) composition comprising more than 10 wt. % of the 4,3'-bis(halophthalimide), each determined by dynamic mechanical analysis over 30° C. to 210° C. on a molded sample, and a ratio of a high shear rate viscosity to a low shear rate viscosity that is at least 30% higher than the same ratio of the same polyetherimide manufactured using the bis(halophthalimide) composition comprising more than 10 wt. % of the 4,3'-bis(halophthalimide), each determined by parallel plate rheometry. In a further embodiment, each halo group is a chloro group.

Further, when the bis(halophthalimide) composition comprises from more than 47 wt. % to less than 85 wt. % of the 4,3'-bis(halophthalimide), the polyetherimide comprises, based on parts of the polyetherimide, less than 100 parts per million each of the 3,3'-bis(halophthalimide), the 4,3'-bis (halophthalimide), and the 4,4'-bis(halophthalimide), less than 100 parts per million of a monohalo(bisphthalimide) of the formula

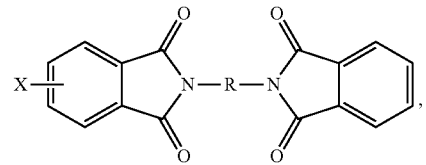

less than 100 parts per million of an unsubstituted bisphthalimide of the formula

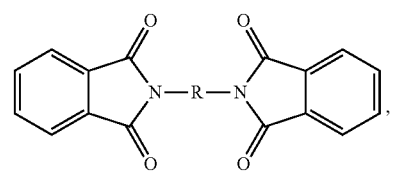

and less than 200 parts per million of a total of the 3,3'-bis (halophthalimide), the 4,3'-bis(halophthalimide), the 4,4'-bis (halophthalimide), and the monohalo(bisphthalimide). In a further embodiment, each halo group is a chloro group. In a still further embodiment, when X is a halide, more specifically a chloride, the polyetherimide comprises and less than 2000 parts per million of halide (specifically chloride) ion; and less than 1.5 wt. % of a cyclic adduct of the dihydroxy aromatic compound and the bis(halophthalimide).

In a specific embodiment, wherein the bis(halophthalimide) composition comprises at least 15 wt. % of a 3,3'-bis (halophthalimide), more than 10 wt. % of a 4,3'-bis(halophthalimide), and from more than 0 to less than 27 wt. % of a 4,4'-bis(halophthalimide), the polyetherimide includes, based on parts of the polyetherimide, less than 100 parts per million each of the 3,3'-bis(halophthalimide), 4,3'-bis (halophthalimide), and 4,4'-bis(halophthalimide), less than 100 parts per million of a halo(bisphthalimide) of the formula

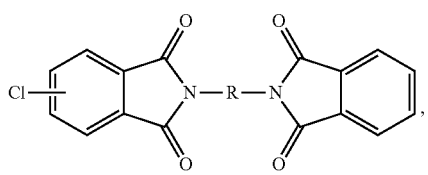

less than 100 parts per million of a bisphthalimide of the formula

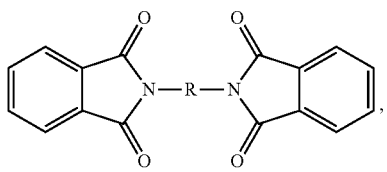

less than 2000 parts per million of halide ion; and less than 4.7, or less than 4 wt. % of a cyclic adduct of the dihydroxy aromatic compound and the bis(chlorophthalimide). In a further embodiment, each halo group is a chloro group.

Also disclosed are articles comprising the above-described polyetherimide compositions. The article can be a sheet, film, multilayer sheet, multilayer film, molded part, extruded profile, coated part, or fiber. Also, the article can be a molded part having a thickness from 0.1 to 100 mm, specifically 1 to 10 mm, more specifically 1 to 5 mm.

The polyetherimide compositions can be formed into articles by any number of methods, for example, shaping, extruding (including profile extrusion), thermoforming, or molding, including injection molding, compression molding, gas assist molding, structural foam molding, and blow molding. In one embodiment a method of forming an article comprises shaping, extruding, blow molding, or injection molding the composition to form the article. Polyetherimide compositions can also formed into articles using thermoplastic processes such as film and sheet extrusion, for example melt casting, blown film extrusion and calendaring. Co-extrusion and lamination processes can be used to form composite multi-layer films or sheets.

Examples of applications include: food service, medical, lighting, lenses, sight glasses, windows, enclosures, safety shields, and the like. The high melt flow allows the composition to be molded into intricate parts with complex shapes and/or thin sections and long flow lengths. Examples of other articles include, but are not limited to, cookware, medical devices, trays, plates, handles, helmets, animal cages, electrical connectors, enclosures for electrical equipment, engine parts, automotive engine parts, lighting sockets and reflectors, electric motor parts, power distribution equipment, communication equipment, computers and the like, comprising devices that have molded in snap fit connectors. The polyetherimide compositions can also be made into film and sheet as well as compositions of laminate systems. Other articles include, for example, fibers, sheets, films, multilayer sheets, multilayer films, molded parts, extruded profiles, coated parts and foams: windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment and instrument panels.

The compositions are especially useful for articles such as reflectors, e.g., automobile reflectors, an optical lens, a fiber optic connector, and an adhesive.

Where the compositions are used an adhesive, the article comprises a first substrate having a first surface, a second substrate having a second surface, and a layer of an adhesive composition comprising the polyetherimide disposed between the first surface and the second surface. For example, the adhesive can be used to adhere two polymer substrates, two metal substrates, or a metal substrate and a polymer substrate. There is no particular limitation as to the type of metals or polymers in the substrates. In an embodiment, the adhesive is especially useful in an article having a metal substrate and a fluoropolymer substrate (such as polytetrafluoroethylene (PTFE)) substrate, and an adhesive composition comprising the poly(etherimide) disposed between a surface of the metal substrate and a surface of the fluoropolymer substrate. In a specific embodiment, an article comprises (i) a polytetrafluoroethylene substrate having a first surface, (ii) a metal substrate having a second surface, and (iii) the polymer composition of claim 1, situated between the polytetrafluoroethylene substrate and the metal substrate. The adhesive layer containing the polymer composition can be in direct contact with the surfaces of the adherends, or an additional layer can be present, for example a primer.

Without further elaboration, it is believed that one skilled in the art can, using the description herein, utilize the present invention. The following examples are included to provide additional guidance to those skilled in the art of practicing the claims. Accordingly, these examples are not intended to limit the invention in any manner.

EXAMPLES

Materials used in the Examples are listed Table 1. Amounts listed in the Examples are in weight percent (wt. %), based on the total weight of the composition.

TABLE 1

| Material | Chemical Description | Source |
|---|---|---|
| ClPAMI Mixture 1 | | |
| 64 wt. % 3,3' ClPAMI | 1,3-bis[N-(3-chlorophthalimido)]benzene | SABIC INNOVATIVE |
| 18 wt. % 4,4'-ClPAMI | 1,3-bis[N-(4-chlorophthalimido)]benzene | PLASTICS |
| 18 wt. % 3,4'-ClPAMI | 1,3-[N-(4-chlorophthalimido)][N-(3-chlorophthalimido)]benzene | |

TABLE 1-continued

| Material | Chemical Description | Source |
|---|---|---|
| ClPAMI Mixture 2 | | |
| 25 wt. % 3,3' ClPAMI, | 1,3-bis[N-(3-chlorophthalimido)]benzene | SABIC INNOVATIVE |
| 25 wt. % 4,4'-ClPAMI | 1,3-bis[N-(4-chlorophthalimido)]benzene | PLASTICS |
| 50 wt. % 3,4'-ClPAMI | 1,3-[N-(4-chlorophthalimido)][N-(3-chlorophthalimido)]benzene | |
| ClPAMI Mixture 3 | | |
| 1 wt. % 3,3' ClPAMI | 1,3-bis[N-(3-chlorophthalimido)]benzene | SABIC INNOVATIVE |
| 90 wt. % 4,4'-ClPAMI | 1,3-bis[N-(4-chlorophthalimido)]benzene | PLASTICS |
| 9 wt. % 3,4'-ClPAMI, | 1,3-[N-(4-chlorophthalimido)][N-(3-chlorophthalimido)]benzene | |
| ClPAMI Mixture 4 | | |
| 95 wt. % 3,3' ClPAMI | 1,3-bis[N-(3-chlorophthalimido)]benzene | SABIC INNOVATIVE |
| 1 wt. % 4,4'-ClPAMI | 1,3-bis[N-(4-chlorophthalimido)]benzene | PLASTICS |
| 4 wt. % 3,4'-ClPAMI | 1,3-[N-(4-chlorophthalimido)][N-(3-chlorophthalimido)]benzene | |
| mPD | meta-Phenylene diamine | DuPont |
| 4-ClPA | 4-Chlorophthalic anhydride | SABIC INNOVATIVE PLASTICS |
| 3-ClPA | 3-Chlorophthalic anhydride | SABIC INNOVATIVE PLASTICS |
| $H_3PO_4$ | Phosphoric acid | Fischer |
| $Na_2BPA$ | Disodium Bisphenol A | Sabic |
| oDCB | ortho-Dichlorobenzene | Fischer |
| HEGCl | Hexaethylguanidinium chloride | Atul |
| SPP | Sodium phenyl phosphinate | Fisher |
| NaPCP | Sodium para-cumyl phenol | SABIC INNOVATIVE PLASTICS |

Techniques and Procedures
GPC Testing Procedure

The GPC samples were prepared by dissolving 5-10 milligrams (mg) of a sample in 10 milliliters (mL) of dichloromethane. Three to five drops of the polymer solution was added to a 10 mL dichloromethane solution with acetic acid (1-2 drops). The sample solution was then filtered and run and the analysis was performed by referencing the polymer peak to the oDCB peak. The instrument was a Waters 2695 separations module, which was calibrated with polystyrene standards from Aldrich chemical company. The cyclics were analyzed by slicing the GPC traces for cyclics n=2 and 3, but the cyclic n=1 was resolved well enough that it could be integrated separately.

Preparation Procedure for a mixture of 3,3'-C1PAMI, 3,4'-C1PAMI, and 4,4'-C1PAMI.

A 250-mL, three-necked flask equipped with a stopper and a gas valve were charged with 3.0 grams (0.0275 moles) of mPD, 5.052 grams (0.0275 moles) 4-C1PA, 5.052 grams (0.0275 moles) of 3-C1PA, 0.011 grams (0.1 mmoles) of SPP, and 60 grams of oDCB. The flask was then equipped with a stir shaft and bearing, nitrogen adapter, and a Dean Stark trap receiver topped with a reflux condenser. A gentle sweep of nitrogen was established through the head-space of the vessel. The reaction was then heated to 100° C. and then ramped slowly to 200° C. The temperature was ramped to 150° C., 180° C., and 200° C. The oDCB was removed from the mixture until it reached 20-50 wt. % solids (20 grams approximately of oDCB). The random mixture of C1PA generates a 1:2:1 ratio of 3,3'-C1PAMI, 3,4'-C1PAMI, and 4,4'-C1PAMI respectively. The higher concentration of 3,4'-C1PAMI allows for a higher weight percent of solids to be achieved than the 4,4'-C1PAMI reaction at 20 weight percent of solids because the solubility of the 3,4'-isomer is better than the other two isomers. Reactions as high as 50 weight percent of solids can be achieved on the lab scale. After 2 to 3 hours a sample was taken: 30 mg in 20 mL of acetonitrile (sonicated 15 minutes and filter) and analyzed on the HPLC calibrated for monoamine (monoamine is the mono-imide of halo-phthalic anhydride with a di-amine as MPD), 4-C1PA, and mPD. Once the amounts of analytes are known the appropriate correction was made using either mPD or 4-C1PA. This was repeated until the 3-monoamine, 4-monoamine, 3-C1PA, and 4-C1PA were within the specification limit of the reaction, 0.2 mole percent. The reaction was then cooled and kept under a static nitrogen atmosphere.

A similar procedure can be used to prepare the C1PAMI isomers separately.

Polymerization Procedure

Polyetherimides were made as follows. Once the mixture of 3,3'-C1PAMI, 3,4'-C1PAMI, and 4,4'-C1PAMI isomers were made, the reaction vessel was then transferred to a dry box where 7.35 grams (0.0270 moles) of the salt $Na_2BPA$ was added. The reaction was then heated to 200° C. with a nitrogen gentle sweep to remove some oDCB, drying the mixture. oDCB was further removed from the mixture until it reached 30-50 weight percent of solids (20-40 grams approximately of oDCB). Once the overheads were dry by Karl Fischer analysis (less than 50 ppm), 71 mg (1 mole %) of HEGCl was charged to the solution; within 30 minutes the solution becomes brownish and finally a golden solution after 90 minutes. The mixture was sampled after 2 hours to measure Mw, and the Mw analysis was repeated every hour until the reaction plateaued (plateau=3 samples within 300 amu). If the Mw was below 45,000 amu, a correction of $Na_2BPA$ was made. The reaction was then quenched with 134 mg (1 mole % respect to polymer) of $H_3PO_4$ (85% aqueous) concentrated. Once the acid was added a nitrogen purge was added to remove any water (5 minutes). The reaction was heated for another hour. The reaction was then cooled and diluted to 10 wt. % with oDCB (approximately 70 mL). The mixture was then filtered on Buchner funnel using a Whatman 1 micrometer glass filter disk. The golden solution was then transferred to 1-liter separatory funnel with equal volume of acidic water and vigorously shaken. Once the golden polymer solution had a phase split it was transferred to a blender with an equal volume of hexane and blended. The mixture was filtered and dried under vacuum at 165° C. for 24 hours.

Sample Preparation for Property Testing

Test parts were injection molded on a 180 ton molding machine with a set melt temperature of approximately 360 to 380° C. and set mold temperature of 150° C. The pellets were dried for 3 to 4 hours at 120° C. in a forced air circulating oven prior to injection molding.

Testing Procedures

Samples that were prepared were tested as follows.

Heat deflection temperature (HDT) was tested on three bars having the dimensions 5×0.5×0.125 inches (127×12.7× 3.2 mm) using ASTM method D648.

Glass transition temperature (Tg) was measured on a 10 mg sample at heating rate of 20° C./min.

Vicat was measures as per ASTM D1525 standard.

DMA was determined in accordance with following procedure. The films samples were mounted on the grips and test was done under tensile mode at 1 Hz frequency and with 2° C./min ramp rate with nitrogen atmosphere. The storage modulus was recorded as function of temperature.

Residual Testing Procedure

The residual amount of C1PAMI and PAMI were analyzed by HPLC analysis from the fractionated lows from the polymer. The fractionated lows were prepared by dissolving 1 gram of PEI into methylene chloride. Then 5 mL of acetonitrile was added to the PEI solution, which was then filter with 0.6 micrometer filter. The filtered liquor was then analyzed by LC on a Waters 2695 Separations module HPLC instrument, which was calibrated with PAMI and C1PAMI isomers.

Rheology Testing Procedure

The viscosity data in Example 4 was measured using parallel plate rheometry, and ratio of viscosities at 1 rad/s to 100 radian/sec was measured at a 350° C. This viscosity ratio gives a measure of shear thinning or improved flow properties. Higher the viscosity ratio, higher is the shear thinning and hence improved flow.

Examples 1-4

The purpose of Examples 1-4 was to evaluate the effect of use of a C1PAMI isomer mixture containing more than 25 wt. % 3,4'-C1PAMI to make polyetherimides (PEIs), compared to PEIs made from a C1PAMI mixture containing less then 25 wt. % 3,4'-chloro PAMI. The C1PAMI mixtures were each made using at least 50% 3-C1PA.

Accordingly, the PEIs of Examples 1-4 were prepared in accordance to the procedures above, using the C1PAMI composition shown in Table 2.

The polymers prepared were targeted for a weight average molecular weight of 55,000 atomic mass units (amu) (polystyrene standards were used for calibration). Table 2 shows a summary of the molecular weight of the PEIs of Examples 1-4, as determined by GPC.

The resulting PEIs were also tested for one or more of Tg, HDT, Vicat, stiffness (as indicated by storage modulus) and flow (as indicated by the rheology ratio), using the methods described above. The results are shown in Table 2.

TABLE 2

|  | Example 1 | Example 2 | Example 3 (Comparative) | Example 4 (Comparative) |
|---|---|---|---|---|
| Isomer (Wt. %) | | | | |
| 3,3' ClPAMI | 64 | 24 | 1 | 95 |
| 3,4'-ClPAMI | 18 | 50 | 9 | 4 |
| 4,4'-ClPAMI | 18 | 26 | 90 | 1 |
| Properties | | | | |
| Mw | 55481 | 54027 | 55000 | 51902 |
| Mn | 19886 | 19837 | 24000 | 16955 |
| Polydispersity Index (PDI) | 2.79 | 2.72 | 2.40 | 3.06 |
| Tg (° C.) | 230 | 229 | 219 | 232 |
| HDT (° C.) (0.44 MPa) | 222 | 218 | 207 | 223 |
| HDT (° C.) (1.8 MPa) | NA | 202 | 192 | NA |
| Vicat (° C.) | 229 | 226 | 216 | 231 |
| Residual ClPAMI (Wt. %) | 300 | 190 | 550 | 450 |
| Cyclic n = 1 (Wt. %) | 4.7 | 1.2 | 0.1 | 15.75 |
| Rheology Ratio | 3 | 3 | 2 | 3 |
| Storage Modulus (MPa) at: | | | | |
| 30° C. | 2666 | 2159 | 1916 | — |
| 40° C. | 2639 | 2137 | 1888 | — |
| 50° C. | 2600 | 2097 | 1845 | — |
| 60° C. | 2561 | 2059 | 1802 | — |
| 70° C. | 2525 | 2028 | 1762 | — |
| 80° C. | 2489 | 2001 | 1723 | — |
| 90° C. | 2450 | 1971 | 1675 | — |
| 100° C. | 2390 | 1926 | 1610 | — |
| 110° C. | 2282 | 1849 | 1435 | — |

As can be seen from Table 2, the molecular weights of the four Examples were similar. The PDI of the 3,3'-C1PAMI-enriched polymers were higher than Comparative Example 3 because the cyclic n=1 product (the adduct of one BPA and 3,3'-C1PAMI) is relatively higher, due to the higher concentration of 3,3'-C1PAMI.

The PEI of Inventive Example 1 had a Tg of 230° C., an HDT of at least 222° C., and a Vicat of 229° C.

The PEI of Inventive Example 2 had a Tg of at least 229° C., an HDT of at least 218° C., and a Vicat of 226° C.

The PEI of Comparative Example 3 had a Tg of at least 219° C., an HDT of at least 207° C., and a Vicat of 216° C. In comparison to the PEIs of inventive Examples 1 and 2, the Tg of Example 3 is at least 10° C. lower, the HDT is at least 11° C. lower, and the Vicat is at least 10° C. Thus, a PEI made from a C1PAMI mixture containing less than 2 wt. % 3,3'-C1PAMI and less than 10 wt. % 3,4'-C1PAMI has a Tg of less than 219° C., an HDT of less than 218° C., and a Vicat of less than 216° C.

The PEI of Comparative Example 4 had a Tg of 232° C., an HDT of at least 223° C., and a Vicat of 231° C. Thus, a PEI made from a C1PAMI mixture containing more than 90 wt. % 3,3'-C1PAMI and less than 10 wt. % 3,4'-C1PAMI can have a Tg of 232° C., an HDT of at least 229° C., and a Vicat of at least 230° C.

These results show that when a PEI is made from a C1PAMI mixture containing at least 15 wt. % 3,3'-C1PAMI, at least 15 wt. % 3,4'-C1PAMI, and a maximum of 27 wt. % of 4,4'-C1PAMI, the resulting PEI has a Tg of at least 230° C. and an HDT of at least 222° C. Alternatively, a PEI made from a C1PAMI mixture containing at least 15 wt. % 3,3'-C1PAMI and 15-85 wt. % 3,4'-C1PAMI has a Tg of at least 229° C. d an HDT of at least 218° C.

The results further show that Inventive Examples 1 and 2 each have a stiffness higher than Comparative Example 3 over the range of 30 to 110° C. Thus, a PEI made from a C1PAMI mixture containing at least 15 wt. % 3,3'-C1PAMI, at least 15 wt. % 3,4'-C1PAMI, and a maximum of 27 wt. % of 4,4'-C1PAMI retains at least 10% higher stiffness at a temperature ranging from 30° C. to 110° C. compared to a sample made from a C1PAMI mixture having less than 10 wt. % 3,4'-chloro PAMI, or a C1PAMI mixture having less than 10 wt. % 3,4'-C1PAMI and 90 wt. % or more of 4,4'-C1PAMI.

Further, the PEIs of Inventive Examples 1 and 2 had a rheology ratio (flow) of 3, whereas the PEI of Comparative Example 3, made from a C1PAMI mixture having less than 10 wt. % 3,4'-C1PAMI has a rheology ratio of 2. Thus, PEI made from a C1PAMI mixture containing at least 15 wt. % 3,3'-C1PAMI, 17-75 wt. % 3,4'-C1PAMI, and more than zero to less than 27 wt. % of 4,4'-C1PAMI has at least 30% higher flow than a PEI made from a C1PAMI mixture containing less than 10 wt. % 3,4'-C1PAMI, or a PEI made from a C1PAMI mixture containing less than 10 wt. % 3,4'-C1PAMI and 90 wt. % or more of 4,4-C1PAMI.

The results in Table 2 also show that the PEIs of Inventive Examples 1 and 2, made from at least 15 wt. % 3,3'-C1PAMI 17-85 wt. % of 3,4'-C1PAMI have less than 400 ppm total residual C1-PAMI and less than 5 wt. % cyclic n=1. The PEIs of Inventive Example 2 made from at least 15 wt. % 3,3'-C1PAMI and 47-85 wt. % of 3,4'-C1PAMI have less than 200 ppm total residual C1-PAMI and the cyclic n=1 byproduct is less than 1.3 wt. %, based on the total weight of the polymer. Comparative Example 4 has residual total C1PAMI levels of at least 450 ppm and a residual cyclic n=1 level of 15.75 wt. %. Thus, although the Tg, HDT, Vicat, and rheology of Inventive Examples 1-2 is very similar to Comparative Example 4, Inventive Examples 1 and 2 have significantly lower residual C1-PAMI and cyclic n=1.

In summary, Inventive Examples 1 and 2 demonstrated an increased HDT of at least 218° C., possessed an increased stiffness of at least 10%, and an increased flow relative to Comparative Example 3. Inventive Examples 1 and 2 also had significantly overall residual levels C1PAMI and the cyclic n=1 as compared to Comparative Example 4.

Example 5

The purpose of Example 5 was to observe the effect of an increasing amount of 3,4'-C1PAMI ratio on the cyclic byproducts content of the PEI. The procedure of Examples 1-4 was followed, except that the C1PAMI isomer wt. % was used as shown in Table 3, and a sequential addition of 3-C1PA and 4-C1PA (50:50 ratio) with mPD was performed.

The resulting PEI was tested for Tg, residual C1PAMI and cyclics, and the rheology ratio, using to the methods described above. The results are shown in Table 3.

TABLE 3

|  | Example 5 |
| --- | --- |
| Isomer (Wt. %) | |
| 3,3' C1PAMI | 16 |
| 3,4'-C1PAMI | 68 |
| 4,4'-C1PAMI | 16 |
| Properties | |
| Tg (° C.) | 229 |
| Residual C1PAMI (Wt. %) | 155 |

TABLE 3-continued

|  | Example 5 |
| --- | --- |
| Cyclic n = 1 (Wt. %) | 0.9 |
| Rheology Ratio (viscosity ratio) | 3.0 |

The cyclic n=1 is generated from 3,3'-C1PAMI and a BPA moiety. It is desirable to reduce 3,3'-C1PAMI concentration for a given amount 3-C1PA used in a formulation or to maximize the 3,4'-C1PAMI concentration. When a 50:50 ratio of 3 and 4-C1PA is added with mPD in one-pot reaction, the predicted statistical outcome is nearly observed, 25 wt. % 3,3'-C1PAMI. If a sequential addition is performed with 3-C1PA and 4-C1PA (50:50 ratio) with mPD the concentration of 3,3'-C1PAMI can be reduced to 16 wt. % (increases the 3,4'-C1PAMI concentration), with a 3,4'-C1PAMI concentration of 68 wt. % and 16 wt. % 4,4'-C1PAMI. The reduction of 3,3'-C1PAMI to 16 wt. % results in a product with 0.9 wt. % of cyclic n=1 in comparison to Example 2 having 1.2 wt. %, as shown in Table 3.

The results further show that when the PEI was made with a mixture containing more than 47 wt. % but less than 85 wt. % 3,4'-C1PAMI and at least 15 wt. % 3,3'-C1PAMI, the resulting PEI had a Tg of at least 229° C. and a rheology ratio (flow) of 3.

Additionally, PEI made with a mixture containing more than 47 wt. % but less than 85 wt. % 3,4'-C1PAMI and at least 15 wt. % 3,3'-C1PAMI has less than 200 ppm total C1-PAMI. The cyclic n=1 byproducts are less than 1 wt. %, based on the total weight of the polymer as compared to Example 2. These results suggest that increasing the amount of 3,4'-C1PAMI lowers the amount of cyclic byproducts.

Examples 6-9

The purpose of Examples 6-9 was to observe the effect of the percent solids in the reaction on the cyclic content. Polyetherimides were prepared in accordance to the procedure above, using the C1PAMI compositions shown in Table 3.

The resulting PEIs were tested for cyclics n=1, 2 and 3 versus the weight percent of solids of reaction pursuant to the methods described above. The results are shown in Table 4, together with the data from Comparative Example 4.

TABLE 4

| Ex. | 3,4'-C1PAMI (Wt. %) | 3,3'-C1PAMI (Wt. %) | 4,4'-C1PAMI (Wt. %) | Solids (Wt. %) | Cyclic n = 2, 3 (Wt. %) | Cyclic n = 1 (Wt. %) |
| --- | --- | --- | --- | --- | --- | --- |
| 6 | 50 | 24 | 26 | 12 | 2.07 | 2.87 |
| 7 | 50 | 24 | 26 | 27 | 0.93 | 1.52 |
| 8 | 50 | 24 | 26 | 34 | 0.79 | 1.18 |
| 9 | 50 | 24 | 26 | 38 | 0.6 | 1.01 |
| Comp. 4 | 4 | 95 | 1 | 28* | 1.5 | 15.70 |

*Denotes maximum wt. % solids achievable

To reduce the cyclic levels, especially the cyclic n=1, in the polymer the weight percent of solids of the polymerization reaction was increased from 30 wt. % up to 50 wt. %. In Example 4 the maximum amount of solids is only to 28 wt. % due to inefficient mixing in the reactor (the reaction medium becomes too thick), but as the concentration of 3,4'-C1PAMI is increased to 45 to 70 wt. % (Examples 6-9) the reaction's weight percent solids can be increase up to 50 wt. %. A polymer made with a 50:50 ratio of 4 and 3-C1PA was run at 12 wt. % solids and had a cyclic levels of 2.9 wt. % for cyclic n=1 and 2.1 wt. % for cyclic n=2 and 3. At the other extreme, a reaction with a 50:50 ratio of 4 and 3-C1PA was ran at 38 wt. % solids had a cyclic level of 1.01 wt. % for cyclic n=1 and 0.5 wt. % for cyclics n=2 and 3.

The results show that when the PEI was made with a mixture containing more than 47 wt. % but less than 85 wt. % 3,4'-C1PAMI and at least 15 wt. % 3,3'-C1PAMI the PEI can achieve a higher weight percent of solids (38 wt. %) for the polymerization reaction versus Examples 3 and 4 which can only achieve weight percent of solids of approximately 30 wt. %. The increase weight percent of solids to 38 wt. % reduces the cyclic n=1 byproducts from 1.52 to 1.03 wt. %, based on the total weight of the polymer. Additionally, the resulting PEI has the same increase in Tg, HDT, Vicat., rheology ratio and C1PAMI residuals as Example 2.

Examples 10-13

The purpose of Examples 10-13 was to observe the effect of percent solids of the reaction on the cyclic content.

The procedure of Examples 1-4 was followed, except that the following C1PAMI isomer wt. % was used as shown in Table 5. The resulting PEIs were tested for cyclic n=1, 2 and 3 versus the weight percent of solids of reaction pursuant to the methods described above. Results are shown in Table 5.

TABLE 5

| Ex. | 3,4'-C1PAMI (Wt. %) | 3,3'-C1PAMI (Wt. %) | 4,4'-C1PAMI (Wt. %) | Solids (Wt. %) | Cyclic n = 2 and 3 (Wt. %) | Cyclic n = 1 (Wt. %) |
|---|---|---|---|---|---|---|
| 10 | 64 | 18 | 18 | 25 | 1.5 | 5.9 |
| 11 | 64 | 18 | 18 | 28 | 1.4 | 5.4 |
| 12 | 64 | 18 | 18 | 32 | 1.3 | 4.9 |
| 13 | 64 | 18 | 18 | 38* | 0.98 | 4.2 |
| Comp. 4 | 4 | 95 | 1 | 28* | 1.5 | 15.70 |

*Denotes maximum wt. % solids achievable

To reduce the cyclic levels, especially the cyclic n=1, in the polymer the weight percent solids of the polymerization reaction was increased from the 30 wt. % up to 40 wt. %. The maximum weight percent of solid in Example 4 is only to 28 wt. % due to inefficient mixing in the reactor (the reaction medium becomes too thick), but as the concentration of 3,4'-C1PAMI is increased to 18 wt. % (Examples 10-13) the maximum weight percent of solids can be increased up to 38 wt. %.

A PEI made with a 25:75 ratio of 4-C1PA:3-C1PA was run at 25 wt. % solids and had a cyclic level of 5.9 wt. % for cyclic n=1 and 1.5 wt. % for cyclic n=2 and 3. At the other extreme, a PEI made with a 25:75 ratio of 4-C1PA: 3-C1PA was run at 38 wt. % solids, had a cyclic level of 4.2 wt. % for cyclic n=1 and 0.98 wt. % for cyclics n=2 and 3.

The results show that when the PEI was made with a mixture containing more than 18 wt. % but less than 85 wt. % 3,4'-C1PAMI and at least 15 wt. % 3,3'-C1PAMI, the PEI can achieve a higher weight percent of solids (38 wt. %) for the polymerization reaction, compared to Examples 3 and 4 which can only achieve a maximum of about 30 wt. % solids. The increased solids reduces the cyclic n=1 byproducts from 5.4 to 4.2 weight %, based on the total weight of the polymer. Additionally, the resulting PEI has the same increase in Tg, HDT, rheology ratio, and C1PAMI residuals as Example 1.

Examples 14-15

The purpose of Examples 14-15 was to observe the effect of the number of $Na_2BPA$ additions to the polymerization reaction. The procedure of Example 2 was followed, except that the following C1PAMI isomer wt. % was used as shown in Table 6.

The resulting PEIs were tested for cyclic n=1, 2 and 3 versus the weight percent of solids of reaction pursuant to the methods described above. Table 6 shows the results.

TABLE 6

| Ex. | 3,4'-C1PAMI (Wt. %) | 3,3'-C1PAMI (Wt. %) | 4,4'-C1PAMI (Wt. %) | Number of salt corrections | Cyclic n = 2, 3 (Wt. %) | Cyclic n = 1 (Wt. %) |
|---|---|---|---|---|---|---|
| 14 | 50 | 24 | 26 | 3 | 0.48 | 0.55 |
| 15 | 50 | 24 | 26 | 0 | 0.88 | 1.12 |

The cyclic n=1 can be further reduced by targeting a low molecular weight and then performing at least two corrections (additions) of $Na_2BPA$. When the polymerization reaction is performed at 38 wt. % solids the cyclic n=1 is approximately 1.1 wt. %, and when three additions are made to adjust to the correct Mw, the cyclic n=1 is further reduced to 0.6 wt. %, whereas the cyclics n=2,3 are not reduced (as determined by GPC).

The results show that when the PEI was made with a mixture containing more than 47 wt. % but less than 85 wt. % 3,4'-C1PAMI and at least 15 wt. % 3,3'-C1PAMI with 38 wt. % solids for the polymerization reaction can achieve a lower cyclic n=1 by using multiple $Na_2BPA$ additions versus adding all the $Na_2BPA$ at once. The increase in $Na_2BPA$ additions reduces the cyclic n=1 byproducts from 1.22 to 0.55 wt. %, based on the total weight of the polymer. Additionally, the resulting PEI has the same increase in Tg, HDT, rheology ratio and C1PAMI residuals as Example 2.

Examples 16-18

The purpose of Examples 16-18 was to observe the effect of using NaPCP in the polymerization reaction. The procedure of Example 2 was followed, except that the following C1PAMI isomer wt. % was used as shown in Table 7.

The resulting PEIs were tested for cyclic n=1 and n=2,3 versus the how the addition of NaPCP was added to the reaction pursuant to the methods described above. Also, the resulting PEIs were tested for residual chloride versus the how the addition of NaPCP was added to the reaction pursuant to the methods described above. Table 7 shows the results.

TABLE 7

| Ex. | 3,4 C1PAMI (Wt. %) | 3,3'-C1PAMI (Wt. %) | 4,4'-C1PAMI (Wt. %) | Mode of addition of $Na_2PCP$ | Cyclic n = 2, 3 (Wt. %) | Cyclic n = 1 (Wt. %) | Residual Cl (ppm) |
|---|---|---|---|---|---|---|---|
| 16 | 50 | 24 | 26 | up front | 0.92 | 1.12 | 1700 |
| 17 | 50 | 24 | 26 | late | 0.58 | 0.51 | 920 |

TABLE 7-continued

| Ex. | 3,4 ClPAMI (Wt. %) | 3,3'- ClPAMI (Wt. %) | 4,4'- ClPAMI (Wt. %) | Mode of addition of Na₂PCP | Cyclic n = 2, 3 (Wt. %) | Cyclic n = 1 (Wt. %) | Residual Cl (ppm) |
|---|---|---|---|---|---|---|---|
| 18 | 50 | 24 | 26 | none | 0.9 | 1.22 | 2500 |
| 1 | | | | none | 1.45 | NA | 2000 |

Surprisingly the addition of the mono-phenoxide upfront (0.419 g, 1.77 mmol) in the polymerization reaction (20 g, 0.0457 moles ClPAMI, and 12.25 g, 0.0450 moles Na₂BPA) had little effect on the cyclic n=1 level (cyclic n=1=1.12); whereas the addition of the mono-phenoxide (0.524 g, 2.21 mmol) late in reaction (once the reaction is on plateau) resulted in a cyclic n=1 level of 0.55 wt. %. The residual ClPAMI and chloride content is also reduced versus the comparative Example without NaPCP and even further with late addition of NaPCP.

The results show that when the PEI was made with a mixture containing more than 47 wt. % but less than 85 wt. % 3,4'-ClPAMI and at least 15 wt. % 3,3'-ClPAMI with 38 wt. % solids a lower cyclic n=1 is achieved by adding NaPCP late in the polymerization reaction. The total chloride level in polymer is also reduced with the use of NaPCP and even further decreased with late addition of NaPCP.

Example 19

A Projector Reflector article is molded with PEI having the properties of EXAMPLE 2, using a 75 Ton Sumitomo injection molding machine. The temperature settings are between 670-710 F, and an injection pressure ranging from 14500 psi to 17500 psi is used. The dimensions of the article are approximately 64 mm high and 100 mm wide, with a wall thickness of 3 to 4 mm.

The article has qualitatively good surface aesthetics, no splay, no cracking during injection molding of the part. The article can be directly metallized with aluminum such that when it is metallized, the article exhibits a reflectance of at least 90%.

Example 20

A Projector Reflector article is molded with PEI having the properties of EXAMPLE 4, using a 75 Ton Sumitomo injection molding machine. The temperature settings are between 670-710 F, and an injection pressure ranging from 14500 psi to 17500 psi is used. The dimensions of the article are approximately 64 mm high and 100 mm wide, with a wall thickness of 3 to 4 mm.

The article has qualitatively poor surface aesthetics, notably, the article's surface exhibits splaying. The article, when metallized with aluminum, exhibits poor reflectance properties, notably less than 90%.

All patents and references cited herein are incorporated by reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polymer composition comprising a polyetherimide having the formula

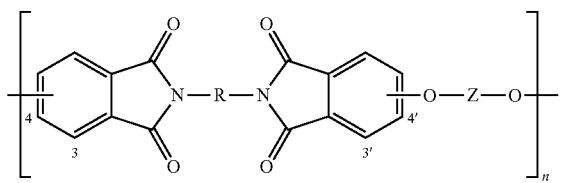

wherein n is greater than 1, each R is the same or different, and is selected from an aromatic hydrocarbon group having 6 to 30 carbon atoms, a halogenated derivative thereof, a straight or branched chain alkylene group having 2 to 10 carbon atoms, a cycloalkylene group having 3 to 10 carbon atoms, or a divalent group of the formula

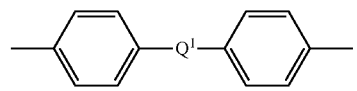

wherein $Q^1$ is selected from —O—, —S—, —C(O)—, —SO₂—, —SO—, and —$C_yH_{2y}$—wherein y is 1 to 5 and a halogenated derivative thereof, each Z is the same or different, and is an aromatic $C_{6-24}$ monocyclic or polycylic polycyclic moiety optionally substituted with 1 to 6 $C_{1-18}$ alkyl groups, 1 to 8 halogen atoms, or a combination thereof, and the divalent bonds between the —O—Z—O—group and the phenyl substituents are in the 3,3', 3,4', 4,3', and 4,4' positions, the divalent bonds of the —O—Z—O—group being made from a bis(halophthalimide) composition comprising, based on the weight of the bis(halophthalimide) composition, at least 15 wt.% of a 3,3'-bis(halophthalimide) of the formula

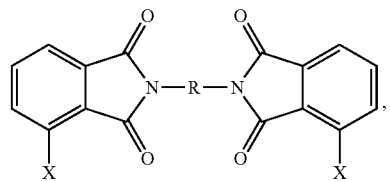

from more than 17 wt.% to less than 85 wt.% of a 4,3'-bis(halophthalimide) of the formula

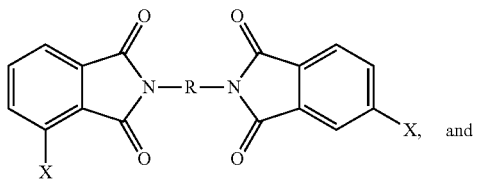, and from more than 0 to less than 27 wt.% of a 4,4'-bis(halophthalimide) of the formula

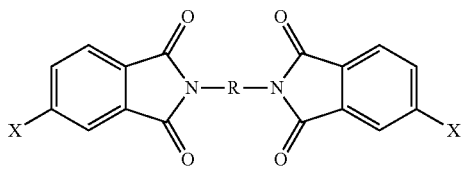

wherein each X is independently fluoro, chloro, bromo, or iodo and R is as defined above, wherein the composition comprises less than 1.5 wt% of a monocyclic adduct of the bis(halophthalimide) composition and an alkali metal salt of a dihydroxy aromatic compound of the formula

MO—Z—OM wherein M is an alkali metal and Z in the dihydroxy aromatic compound is the same as the Z in polyetherimide; and wherein the polyetherimide has a glass transition temperature of greater than 180° C.

2. A polyetherimide composition manufactured by reaction of an alkali metal salt of a dihydroxy aromatic compound of the formula

MO—Z—OM wherein M is an alkali metal and Z is an aromatic $C_{6-24}$ monocyclic or polycyclic moiety optionally substituted with 1 to 6 $C_{1-8}$ alkyl groups, 1 to 8 halogen atoms, or a combination thereof, with a bis(halophthalimide) composition comprising, based on the weight of the bis(halophthalimide) composition,
at least 15 wt.% of a 3,3'-bis(halophthalimide) of the formula

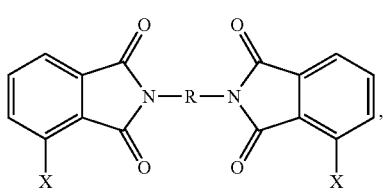, from more than 17 wt.% to less than 85 wt.% of a 4,3'-bis(halophthalimide) of the formula

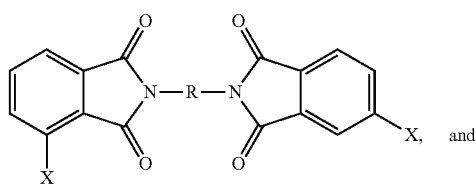, and from more than 0 to less than 27 wt.% of a 4,4'-bis(halophthalimide) of the formula

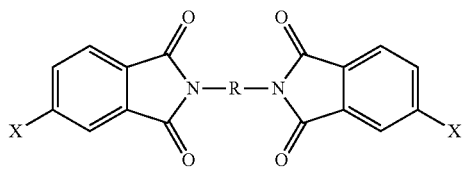

wherein
each R is selected from an aromatic hydrocarbon group having 6 to 30 carbon atoms, a halogenated derivative thereof, a straight or branched chain alkylene group having 2 to 10 carbon atoms, a cycloalkylene group having 3 to 10 carbon atoms, or a divalent group of the formula

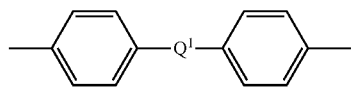

wherein Q' is selected from —O—, —S—, —C(O)—, —SO$_2$—, —SO—, and —$C_yH_{2y}$—wherein y is 1 to 5 and a halogenated derivative thereof, and
each X is independently fluoro, chloro, bromo, or iodo, and further wherein
the polyetherimide is of the formula

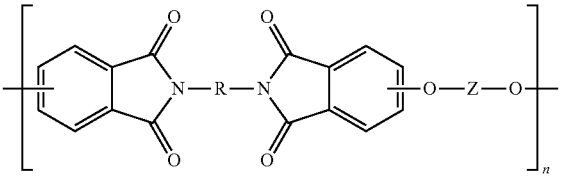

wherein n is greater than 1, each R is the same or different, each Z is the same or different, and are as defined above, and the divalent bonds between the —O—Z—O— group and the phenyl substituents are in the 3,3', 3,4', 4,3', and 4,4' positions,
wherein the composition comprises less than 1.5 wt% of a monocyclic adduct of the bis(halophthalimide) composition and the alkali metal salt of the formula

MO—Z—OM.

3. The composition of claim 1, wherein the polyetherimide has
a heat deflection temperature of at least 218° C., determined in accordance with ASTM 648 on a molded sample, a heat deflection temperature at least 10° C. higher than a heat deflection temperature of the same polyetherimide manufactured using a bis(halophthalimide) composition comprising more than 10 wt.% of the 4,3'-bis(halophthalimide), each determined in accordance with ASTM 648 at 0.455 megaPascals stress and at 3.2 millimeters thickness on a molded sample, at least 10% higher stiffness than a stiffness of the same polyetherimide manufactured using the bis(halophthalimide) composition comprising more than 10 wt.% of the 4,3'-bis(halophthalimide), each determined by dynamic mechanical analysis over 30° C. to 210° C. on a molded sample, and a ratio of a high shear rate viscosity to a low shear rate viscosity that is at least 30% higher than the same ratio of the same polyetherimide manufactured using the bis(halophthalimide) composition comprising more than 10wt.% of the 4,3'-bis(halophthalimide), each determined by parallel plate rheometry.

4. The composition of claim 1, wherein
the bis(halophthalimide) composition comprises from more than 47 wt.% to less than 85 wt.% of the 4,3'-bis(halophthalimide).

5. The composition of claim 4, wherein the polyetherimide comprises, based on parts of the polyetherimide,
less than 100 parts per million each of the 3,3'-bis(halophthalimide), the 4,3'-bis(halophthalimide), and the 4,4'-bis(halophthalimide).,
less than 100 parts per million of a halo(bisphthalimide) of the formula

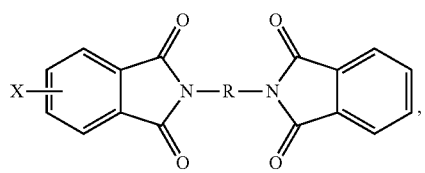

less than 100 parts per million of a bisphthalimide of the formula

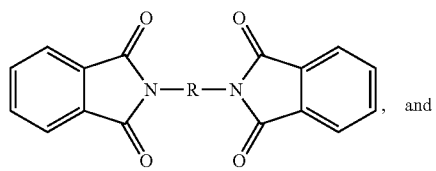, and less than 200 parts per million of a total of the 3,3'-bis(halophthalimide), the 4,3 '-bis(halophthalimide), the 4,4'-bis(halophthalimide), and the halo(bisphthalimide).

6. The composition of claim 4, wherein
the polyetherimide has a heat deflection temperature of at least 218° C., determined in accordance with ASTM 648 on a molded sample,
the polyetherimide has a heat deflection temperature at least 10° C. higher than the heat deflection temperature of the same polyetherimide manufactured using the bis(halophthalimide) composition comprising less than 10 wt.% of the 4,3'-bis(halophthalimide) and more than 27wt.% of the 4,4'-bis(halophthalimide), each determined in accordance with ASTM 648 at 0.455 megaPascals stress and at 3.2 millimeters thickness on a molded sample, the polyetherimide has at least 10% higher stiffness than the stiffness of the same polyetherimide manufactured using the bis(chlorophthalimide) composition comprising less than 10 wt.% of the 4,3'-bis(halophthalimide) and more than 27 wt.% of the 4,4'-bis(halophthalimide), each determined by dynamic mechanical analysis over 30° C. to 210° C., on a molded sample, and the polyetherimide has a ratio of a high shear rate viscosity to a low shear rate viscosity that is at least 30% higher than the same ratio of the same polyetherimide manufactured using the bis(halophthalimide) composition comprising less than 10 wt.% of the 4,3'-bis (halophthalimide) and more than 27 wt.% of the 4,4'-bis(halophthalimide), each determined by parallel plate rheometry.

7. The composition of claim 1, wherein the bis(halophthalimide) composition comprises
from 15 to less than 85 wt.% of the 3,3'-bis(halophthalimide),
from more than 47 to less than 85wt.% of the 4,3'-bis(halophthalimide), and
from more than 0 to less than 27 wt.% of the 4,4'-bis(halophthalimide).

8. The composition of claim 1, wherein
R is a divalent radical of the formula

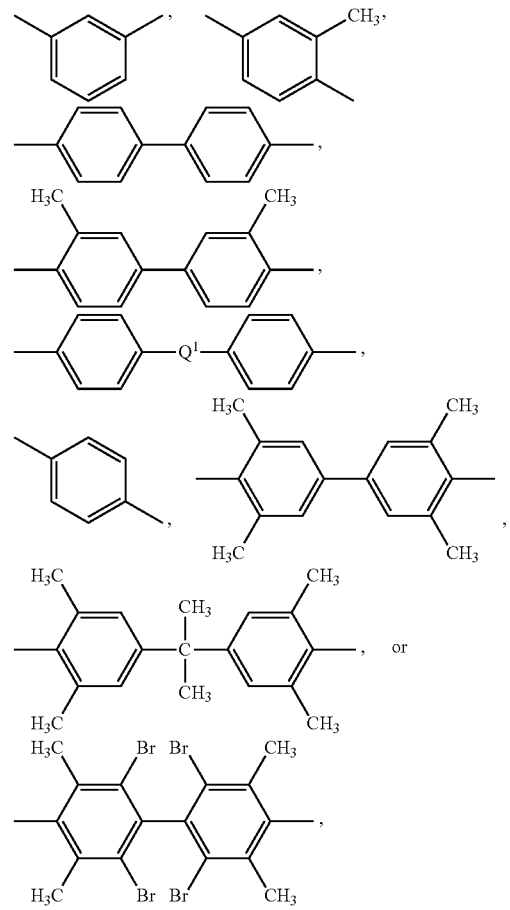

wherein $Q^1$ is selected from —O—, —S—, —C(O)—, —SO$_2$—, —SO—, and —C$_y$H$_{2y}$—wherein y is an integer from 1 to 5 and a halogenated derivative thereof; and Z is a divalent group of formula

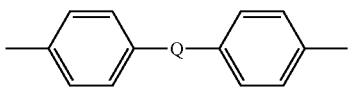

wherein Q is —O—, —S—, —C(O)—, —SO$_2$—, —SO—, or —C$_y$H$_{2y}$—wherein y is an integer from 1 to 5 and a halogenated derivative thereof.

9. The composition of claim 1, wherein Z is 2,2-(4-phenylene)isopropylidene and R is m-phenylene, p-phenylene diarylsulfone, or a combination thereof.

10. The composition of claim 1, further comprising an additive selected from impact modifiers, fillers, reinforcing agents, anti-oxidants, heat stabilizers, light stabilizers, ultraviolet light absorbers, plasticizers, lubricants, mold release agents, antistatic agents, colorants, blowing agents, flame retardants, anti-drip agents, and radiation stabilizers, and a combination thereof.

11. The composition of claim 1, further comprising an additive selected from an antioxidant, an ultraviolet light absorber, a mold release agent, and a combination thereof.

12. A polymer composition comprising a polyetherimide of the formula

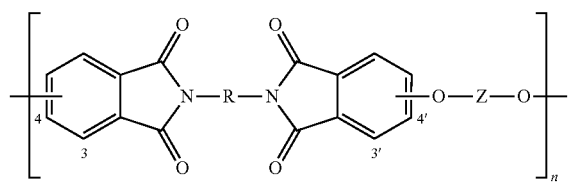

wherein
n is greater than 1,
each R is the same or different, and wherein R is selected from an aromatic hydrocarbon group having 6 to 30 carbon atoms, a halogenated derivative thereof, a straight or branched chain alkylene group having 2 to 10 carbon atoms, a cycloalkylene group having 3 to 10 carbon atoms, or a divalent group of the formula

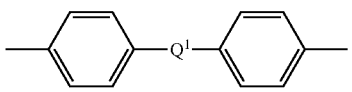

wherein Q$^1$ is selected from —O—, —S—, —C(O)—, —SO$_2$—, —SO—, —C$_y$H$_{2y}$—wherein y is 1 to 5, and a halogenated derivative thereof,
each Z is the same or different and is an aromatic C$_{6-24}$ monocyclic or polycyclic moiety optionally substituted with 1 to 6 C$_{1-8}$ alkyl groups, 1 to 8 halogen atoms, or a combination thereof, and
the divalent bonds between the —O—Z—O— group and the phenyl substituents are in the 3,3', 3,4', 4,3', and 4,4' positions, the divalent bonds between —O—Z—O— group and the phenyl substituents being made from a bis(halophthalimide) composition comprising, based on the weight of the bis(halophthalimide) composition,
at least 15 wt.% of a 3,3'-bis(halophthalimide) of the formula

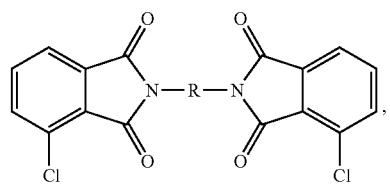

from more than 17 wt.% to less than 85 wt.% of a 4,3'-bis(halophthalimide) of the formula

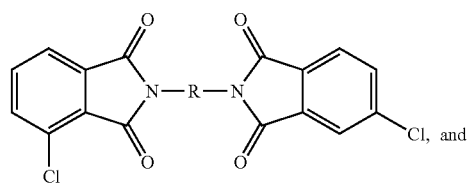

from more than 0 to less than 27 wt. % of a (4,4'-bis(halophthalimide) of the formula

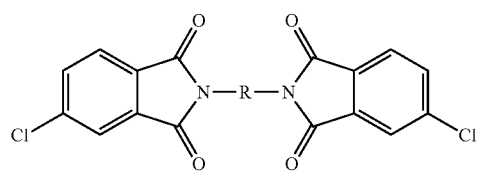

wherein R is as defined above;
wherein the composition comprises less than 1.5 wt% of a monocyclic adduct of the bis(halophthalimide) composition and an alkali metal salt of a dihydroxy aromatic compound of the formula

MO—Z—OM wherein M is an alkali metal and Z in the dihydroxy aromatic compound is the same as the Z in polyetherimide; and
wherein the polyetherimide has a glass transition temperature of greater than 180° C.

13. A polyetherimide composition manufactured by reaction of an alkali metal salt of a dihydroxy aromatic compound of the formula

MO—Z—OM wherein M is an alkali metal and Z is a divalent radical of the formula

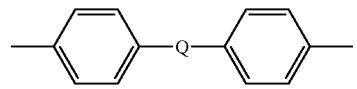

wherein Q is selected from —O—, —S—, —C(O)—, —SO$_2$—, —SO—, and —C$_y$H$_{2y}$—wherein y is an integer from 1 to 5 and a halogenated derivative thereof, with
a bis(chlorophthalimide) composition comprising, based on the weight of the bis(chlorophthalimide) composition,
at least 15 wt.% of a 3,3'-bis(chlorophthalimide) of the formula

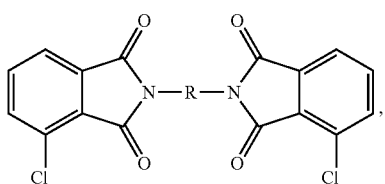

from more than 17 wt.% to less than 85 wt.% of a 4,3'-bis(chlorophthalimide) of the formula

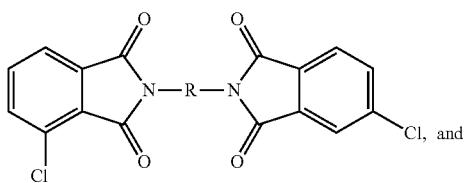

from more than 0 to less than 27 wt.% of a 4,4'-bis(chlorophthalimide) of the formula

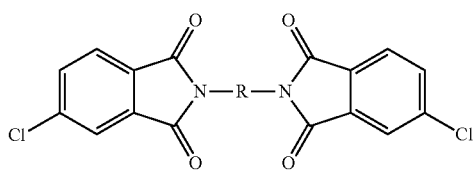

wherein
each R is a divalent group of the formula

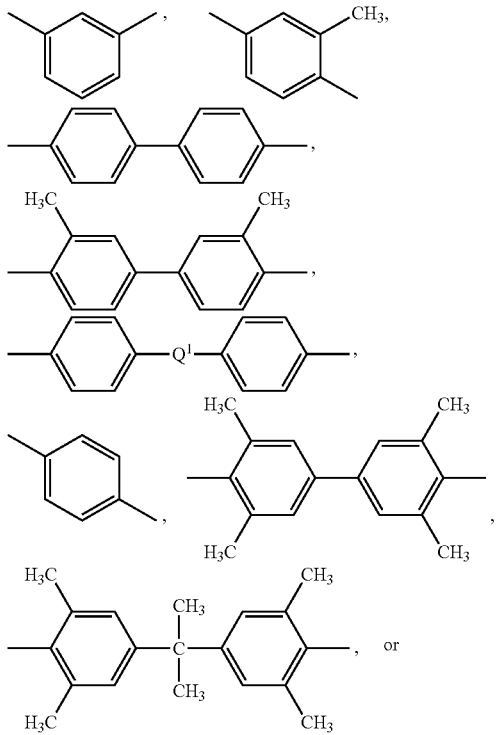

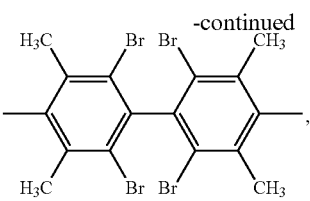

and
$Q^1$ is selected from —O—, —S—, —C(O)—, —SO$_2$—, —SO—, —C$_y$H$_{2y}$— wherein y is 1 to 5, and a halogenated derivative thereof, further wherein
the polyetherimide is of the formula

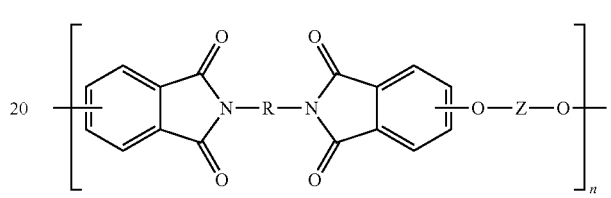

wherein n is greater than 1, each R is the same or different, each Z is the same or different, and are as defined above, and the divalent bonds between the —OZ—O— group and the phenyl substituents are in the 3,3', 3,4', 4,3', and 4,4' positions;
wherein the composition comprises less than 1.5 wt% of a monocyclic adduct of the bis(halophthalimide) composition and the alkali metal salt of the formula

MO—Z—OM.

14. The composition of claim 12, wherein the polyetherimide has a heat deflection temperature of at least 218° C., in accordance with ASTM 648 on a molded sample,
the polyetherimide has a heat deflection temperature at least 10° C. higher than a heat deflection temperature of the same polyetherimide manufactured using a bis(chlorophthalimide) composition comprising more than 10 wt.% of the 4,3'-bis bis(chlorophthalimide), each determined in accordance with ASTM 648 at, 0.455megaPascals stress and at 3.2 millimeters thickness on a molded sample,
the polyetherimide has at least 10% higher stiffness than the stiffness of the same polyetherimide manufactured using the bis(chlorophthalimide) composition comprising more than 10 wt.% of the 4,3'-bis(chlorophthalimide), each determined by dynamic mechanical analysis over 30° C. to 210° C. on a molded sample, and
the polyetherimide has a ratio of a high shear rate viscosity to a low shear rate viscosity that is at least 30% higher than the same ratio of the same polyetherimide manufactured using the bis(chlorophthalimide) composition comprising more than 10 wt.% of the 4,3'-bis(chlorophthalimide), each determined by parallel plate rheometry.

15. The composition of claim 12, wherein
the bis(chlorophthalimide) composition comprises from more than 47 wt.% to less than 85 wt.% of the 4,3'-bis(chlorophthalimide), and
the polyetherimide comprises, based on parts of the polyetherimide,
less than 100 parts per million each of the 3,3'-bis(chlorophthalimide), the 4,3'-bis(chlorophthalimide), and the 4,4'-bis(chlorophthalimide), less than 100 parts per million of a chloro(bisphthalimide) of the formula

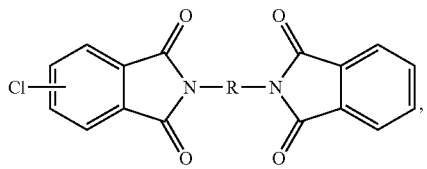

less than 100 parts per million of a bisphthalimide of the formula

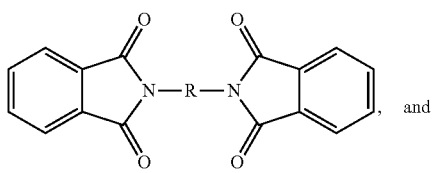, and less than 200 parts per million of a total of the 3,3'-bis(chlorophthalimide), the 4,3'-bis(chlorophthalimide), the 4,4'-bis(chlorophthalimide), and the chloro(bisphthalimide).

16. The composition of claim 15, wherein
the polyetherimide has a heat deflection temperature of at least 218° C., in accordance with ASTM 648 on a molded sample;
the polyetherimide has a heat deflection temperature at least 10° C. higher than the heat deflection temperature of the same polyetherimide manufactured using the bis(chlorophthalimide) composition comprising less than 10 wt.% of the 4,3'- bis (chlorophthalimide) and more than 27 wt.% of the 4,4'-bis(chlorophthalimide), each determined in accordance with ASTM 648 at 0.455 megaPascals stress and at 3.2 millimeters thickness on a molded sample;
the polyetherimide has at least 10% higher stiffness than the stiffness of the same polyetherimide manufactured using the bis(chlorophthalimide) composition comprising less than 10 wt.% of the 4,3'-bis(chlorophthalimide) and more than 27 wt.% of the 4,4'-bis(chlorophthalimide), each determined by dynamic mechanical analysis over 30° C. to 210° C., on a molded sample; and
the polyetherimide has a ratio of a high shear rate viscosity to a low shear rate viscosity that is at least 30% higher than the same ratio of the same polyetherimide manufactured using the bis(chlorophthalimide) composition comprising less than 10 wt.% of the 4,3'-bis(chlorophthalimide) and more than 27 wt.% of the 4,4'-bis(chlorophthalimide), each determined by parallel plate rheometry.

17. The composition of claim 12, wherein the bis(chlorophthalimide) composition comprises
from 15 to less than 85 wt.% of the 3,3'-bis(chlorophthalimide),
from 47 to less than 85 wt.% of the 4,3-bis(chlorophthalimide), and
from more than 0 to less than 27 wt.% of the 4,4'- bis (chlorophthalimide).

18. The composition of claim 12, wherein Z is 2,2-(4-phenylene)isopropylidene and R is m-phenylene, p-phenylene diarylsulfone, or a combination thereof.

19. A method for the manufacture of the polyetherimide composition of claim 1, the method comprising reacting, in the presence of a catalytically active amount of a phase transfer catalyst, the alkali metal salt of the dihydroxy aromatic compound with the bis(halophthalimide) composition.

20. The method of claim 19, wherein a first portion of the alkali metal salt of the dihydroxy aromatic compound reacted with the bis(halophthalimide) composition to form a first polyetherimide having a first molecular weight; and a second portion of the e alkali metal salt of the dihydroxy aromatic compound is added to first polyetherimide to form a second polyetherimide having a second molecular weight higher than the first molecular weight.

21. A method for the manufacture of the polyetherimide composition of claim 12, the method comprising reacting, in the presence of a catalytically active amount of a phase transfer catalyst, the alkali metal salt of a dihydroxy aromatic compound with the bis(chlorophthalimide) composition.

22. The method of claim 21, wherein a first portion of the alkali metal salt of the dihydroxy aromatic compound reacted with the bis(halophthalimide) composition to form a first polyetherimide having a first molecular weight; and a second portion of the alkali metal salt of the dihydroxy aromatic compound is added to first polyetherimide to form a second polyetherimide having a second molecular weight higher than the first molecular weight.

23. An article comprising the composition of claim 1.

24. The article of claim 23, selected from a sheet, film, multilayer sheet, multilayer film, molded part, extruded profile, coated part, and fiber.

25. The article of claim 24, wherein the article is a molded part having a thickness from 1 to 5 millimeters.

26. The article of claim 23, selected from a reflector, an optical lens, a fiber optic connector, and an adhesive.

27. The article of claim 23, the article comprising
(i) a polytetrafluoroethylene substrate having a first surface,
(ii) a metal substrate having a second surface, and
(iii) the polymer composition of claim 1, situated between the polytetrafluoroethylene substrate and the metal substrate.

28. A method of forming an article, comprising shaping, extruding, blow molding, or molding the composition of claim 1 to form the article.

29. The method of claim 28, further comprising molding the composition to form an article having a thickness from 1 to 5 millimeters.

30. An article comprising the composition of claim 4.

31. The article of claim 30, selected from a sheet, film, multilayer sheet, multilayer film, molded part, extruded profile, coated part, and fiber.

32. A method of forming an article, comprising shaping, extruding, blow molding, or molding the composition of claim 4 to form the article.

33. The method of claim 32, comprising molding the composition to form an article having a thickness from 1 to 5 millimeters.

34. An article comprising the composition of claim 12.

35. The article of claim 34, selected from a sheet, film, multilayer sheet, multilayer film, molded part, extruded profile, coated part, and fiber.

36. The article of claim 35, wherein the article is a molded part having a thickness from 1 to 5 millimeters.

37. The article of claim 34, selected from a reflector, an optical lens, a fiber optic connector, and an adhesive.

38. The article of claim 34, the article comprising
(i) a polytetrafluoroethylene substrate having a first surface,
(ii) a metal substrate having a second surface, and
(iii) the polymer composition of claim 1, situated between the polytetrafluoroethylene substrate and the metal substrate.

39. A method of forming an article, comprising shaping, extruding, blow molding, or molding the composition of claim 12 to form the article.

40. The method of claim 39, comprising molding the composition to form an article having a thickness from 1 to 5 millimeters.

41. An article comprising the composition of claim 15.

42. The article of claim 41, selected from a sheet, film, multilayer sheet, multilayer film, molded part, extruded profile, coated part, and fiber.

43. The article of claim 42, wherein the article is a molded part having a thickness from 1 to 5 millimeters.

44. A method of forming an article, comprising shaping, extruding, blow molding, or molding the composition of claim 15 to form the article.

45. The method of claim 44, comprising molding the composition to form an article having a thickness from 1 to 5 millimeters.

46. An article comprising the composition of claim 17.

47. The article of claim 46, selected from a sheet, film, multilayer sheet, multilayer film, molded part, extruded profile, coated part, and fiber.

48. The article of claim 47, wherein the article is a molded part having a thickness from 1 to 5 millimeters.

49. A method of forming an article, comprising shaping, extruding, blow molding, or molding the composition of claim 17 to form the article.

50. The method of claim 49, comprising molding the composition to form an article having a thickness from 1 to 5 millimeters.

* * * * *